US012513661B2

(12) United States Patent
Säily et al.

(10) Patent No.: US 12,513,661 B2
(45) Date of Patent: Dec. 30, 2025

(54) USE OF SIDELINK COMMUNICATIONS FOR BACKSCATTER NODE POSITIONING WITHIN WIRELESS NETWORKS

(71) Applicant: Nokia Technologies Oy, Espoo (FI)

(72) Inventors: Mikko Säily, Espoo (FI); Stephan Sigg, Espoo (FI); Sameera Palipana, Espoo (FI); Si-Ahmed Naas, Espoo (FI)

(73) Assignee: Nokia Technologies Oy, Espoo (FI)

( * ) Notice: Subject to any disclaimer, the term of this patent is extended or adjusted under 35 U.S.C. 154(b) by 300 days.

(21) Appl. No.: 18/550,328

(22) PCT Filed: Dec. 2, 2021

(86) PCT No.: PCT/FI2021/050841
§ 371 (c)(1),
(2) Date: Sep. 13, 2023

(87) PCT Pub. No.: WO2022/200673
PCT Pub. Date: Sep. 29, 2022

(65) Prior Publication Data
US 2024/0163840 A1 May 16, 2024

(30) Foreign Application Priority Data
Mar. 22, 2021 (FI) .................... 20215317

(51) Int. Cl.
*H04W 64/00* (2009.01)
*H04L 5/00* (2006.01)
(Continued)

(52) U.S. Cl.
CPC ......... *H04W 64/006* (2013.01); *H04L 5/0053* (2013.01); *H04L 25/0222* (2013.01); *H04W 92/18* (2013.01)

(58) Field of Classification Search
CPC . H04W 64/006; H04L 5/0053; H04L 25/0222
See application file for complete search history.

(56) References Cited

U.S. PATENT DOCUMENTS

| 6,380,894 B1 | 4/2002 | Boyd et al. |
| 7,009,561 B2 | 3/2006 | Menache et al. |

(Continued)

FOREIGN PATENT DOCUMENTS

| CN | 112073893 A | 12/2020 |
| CN | 112505624 A | 3/2021 |

(Continued)

OTHER PUBLICATIONS

"3rd Generation Partnership Project; Technical Specification Group Services and System Aspects; Service requirements for the 5G system; Stage 1 (Release 18)", 3GPP TS 22.261, V18.0.0, Sep. 2020, 84 pages.

(Continued)

*Primary Examiner* — Curtis B Odom
(74) *Attorney, Agent, or Firm* — Barta Jones, PLLC

(57) ABSTRACT

A method includes determining backscatter frequency offsets assigned to backscatter nodes to be positioned; controlling transmitting, by the first user device, a positioning signal using time-frequency resources found unused by the first user device or allocated by a network node; controlling receiving, by the first user device via sidelink communication, channel estimate information from a plurality of second user devices, wherein a channel estimate information indicates an estimate of a channel between one of the plurality of second user devices and each of the at least some of the backscatter nodes, and wherein the channel estimate information received from each second user device is based on the transmitted positioning signal that is frequency shifted by an assigned backscatter frequency offset and reflected by each of the at least some of the backscatter nodes; and (Continued)

controlling transmitting, by the first user device to the network node, the received channel estimate information.

22 Claims, 12 Drawing Sheets

(51) Int. Cl.
*H04L 25/02* (2006.01)
*H04W 92/18* (2009.01)

(56) References Cited

U.S. PATENT DOCUMENTS

| | | |
|---|---|---|
| 2014/0368321 A1 | 12/2014 | Namgoong et al. |
| 2019/0230618 A1 | 7/2019 | Saur et al. |
| 2020/0018846 A1 | 1/2020 | Sundaresan et al. |
| 2020/0280953 A1* | 9/2020 | Luo .................... G01S 5/02213 |
| 2020/0313939 A1 | 10/2020 | Lopez et al. |
| 2020/0314752 A1 | 10/2020 | Haque et al. |

FOREIGN PATENT DOCUMENTS

| | | |
|---|---|---|
| KR | 101590294 B1 | 2/2016 |
| WO | 2014/153516 A1 | 9/2014 |
| WO | 2019/158187 A1 | 8/2019 |
| WO | 2020/159714 A1 | 8/2020 |

OTHER PUBLICATIONS

Nandakumar et al., "3D Localization for Sub-Centimeter Sized Devices", Proceedings of the 16th ACM Conference on Embedded Networked Sensor Systems, Nov. 2018, pp. 108-119.
Schmidt, "Multiple emitter location and signal parameter estimation", IEEE Transactions on Antennas and Propagation, vol. 34, No. 3, Mar. 1986, pp. 276-280.
Office action received for corresponding Finnish Patent Application No. 20215317, dated Aug. 26, 2021, 11 pages.
International Search Report and Written Opinion received for corresponding Patent Cooperation Treaty Application No. PCT/FI2021/050841, dated Feb. 10, 2022, 15 pages.
Extended European Search Report received for corresponding European Patent Application No. 21932811.9, dated Dec. 4, 2024, 9 pages.
Yang et al., "iLPS: Local Positioning System with Simultaneous Localization and Wireless Communication", IEEE Infocom—IEEE Conference on Computer Communications, Apr. 29-May 2, 2019, pp. 379-387.

\* cited by examiner

Determining, by a network node within a wireless network, time-frequency resources for transmission of a positioning signal by a first user device via sidelink communications, and backscatter frequency offsets assigned to backscatter nodes to be positioned, wherein a specific backscatter frequency offset is assigned to each backscatter node to be positioned, and wherein each of the backscatter nodes to be positioned is identifiable based on an assigned backscatter frequency offset used when at least some of the backscatter nodes reflect the positioning signal — 410

Controlling transmitting, by the network node to the first user device, the time-frequency resources for transmission of the positioning signal by the first user device via sidelink communication, and information identifying the backscatter frequency offsets assigned to the backscatter nodes to be positioned — 420

Controlling transmitting, by the network node to a plurality of second user devices, the information identifying the backscatter frequency offsets assigned to the backscatter nodes to be positioned, for the second user devices to receive a backscatter signal from at least some of the backscatter nodes to be positioned, wherein each of the backscatter signals is based on the positioning signal that has been frequency shifted by an assigned backscatter frequency offset and reflected by each of at least some of the backscatter nodes to be positioned — 430

Controlling receiving by the network node from the first user device, channel estimate information determined by each of the plurality of second user devices, wherein the channel estimate information indicates an estimate of a channel between one of the plurality of second user devices and each of the at least some of the backscatter nodes to be positioned, wherein the channel estimate information is based on the positioning signal that is frequency shifted by an assigned backscatter frequency offset and reflected by each of the at least some of the backscatter nodes to be positioned — 440

FIG. 4

USE OF SIDELINK COMMUNICATIONS FOR BACKSCATTER NODE POSITIONING WITHIN WIRELESS NETWORKS

RELATED APPLICATION

This application was originally filed as PCT Application No. PCT/FI2021/050841, filed on Dec. 2, 2021 which claims priority from FI application No. 20215317, filed on Mar. 22, 2021, each of which is incorporated herein by reference in its entirety.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a method may include: determining, by a first user device within a wireless network, backscatter frequency offsets assigned to backscatter nodes to be positioned, wherein a specific backscatter frequency offset is assigned to each backscatter node, and wherein each of the backscatter nodes is identifiable based on an assigned backscatter frequency offset used when at least some of the backscatter nodes reflect a positioning signal; controlling transmitting, by the first user device to the at least some of the backscatter nodes via sidelink communication, configuration information comprising the backscatter frequency offsets assigned to the backscatter nodes to be positioned; in response to receiving, by the first user device from one or more of the backscatter nodes, at least one acknowledgement to the configuration information, controlling transmitting, by the first user device, the positioning signal using time-frequency resources found unused by the first user device or allocated by a network node; controlling receiving, by the first user device via sidelink communication, channel estimate information from a plurality of second user devices, wherein a channel estimate information indicates an estimate of a channel between one of the plurality of second user devices and each of the at least some of the backscatter nodes, and wherein the channel estimate information received from each second user device is based on the transmitted positioning signal that is frequency shifted by an assigned backscatter frequency offset and reflected by each of the at least some of the backscatter nodes; and controlling transmitting, by the first user device to the network node, the received channel estimate information.

According to an example embodiment, a method may include: controlling receiving, by a first user device within a wireless network from either a network node or a second user device, backscatter frequency offsets assigned to backscatter nodes to be positioned, wherein a specific backscatter frequency offset is assigned to each backscatter node, and wherein each of the backscatter nodes is identifiable based on an assigned backscatter frequency offset used when at least some of the backscatter nodes reflect a positioning signal; controlling receiving, by the first user device, a backscatter signal from at least some of the backscatter nodes to be positioned, wherein each of the backscatter signals is based on the positioning signal that has been frequency shifted by an assigned backscatter frequency offset and reflected by each of at least some of the backscatter nodes to be positioned; determining, by the first user device based on a backscatter signal received from each of at least some of the backscatter nodes to be positioned, channel estimate information that indicates an estimate of a channel between the first user device and each of the at least some of the backscatter nodes to be positioned, wherein the channel estimate information is based on the positioning signal that is frequency shifted by an assigned backscatter frequency offset and reflected by each of the at least some of the backscatter nodes to be positioned; and controlling transmitting, by the first user device to the second user device via sidelink communication, the channel estimate information determined by the first user device.

According to an example embodiment, a method may include: determining, by a network node within a wireless network, time-frequency resources for transmission of a positioning signal by a first user device via sidelink communications, and backscatter frequency offsets assigned to backscatter nodes to be positioned, wherein a specific backscatter frequency offset is assigned to each backscatter node to be positioned, and wherein each of the backscatter nodes to be positioned is identifiable based on an assigned backscatter frequency offset used when at least some of the backscatter nodes reflect the positioning signal; controlling transmitting, by the network node to the first user device, the time-frequency resources for transmission of the positioning signal by the first user device via sidelink communication, and information identifying the backscatter frequency offsets assigned to the backscatter nodes to be positioned; controlling transmitting, by the network node to a plurality of second user devices, the information identifying the backscatter frequency offsets assigned to the backscatter nodes to be positioned, for the second user devices to receive a backscatter signal from at least some of the backscatter nodes to be positioned, wherein each of the backscatter signals is based on the positioning signal that has been frequency shifted by an assigned backscatter frequency offset and reflected by each of at least some of the backscatter nodes to be positioned; and controlling receiving by the network node from the first user device, channel estimate information determined by each of the plurality of second user devices, wherein the channel estimate information indicates an estimate of a channel between one of the plurality of second user devices and each of the at least some of the backscatter nodes to be positioned, wherein the channel estimate information is based on the positioning signal that is frequency shifted by an assigned backscatter frequency offset and reflected by each of the at least some of the backscatter nodes to be positioned.

Other example embodiments are provided or described for each of the example methods, including: means for performing any of the example methods; a non-transitory computer-readable storage medium comprising instructions stored thereon that, when executed by at least one processor, are configured to cause a computing system to perform any of the example methods; and an apparatus including at least one processor, and at least one memory including computer program code, the at least one memory and the computer program code configured to, with the at least one processor, cause the apparatus at least to perform any of the example methods.

The details of one or more examples of embodiments are set forth in the accompanying drawings and the description below. Other features will be apparent from the description and drawings, and from the claims.

BRIEF DESCRIPTION OF THE DRAWINGS

FIG. 4 is a flow chart illustrating operation of a network node (e.g., base station, gNB, DU) according to an example embodiment.

DETAILED DESCRIPTION

Figure 1:
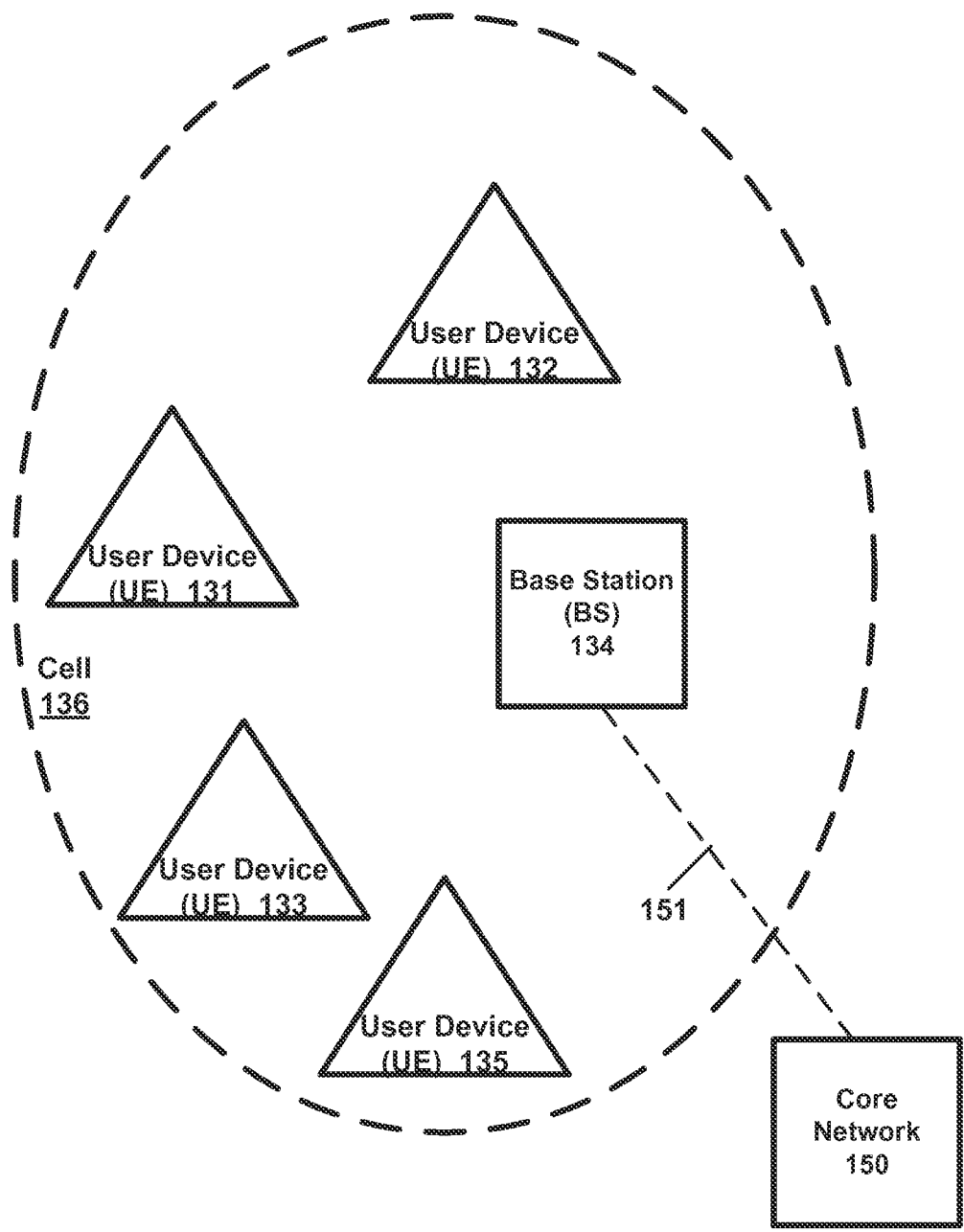
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS or split gNB). At least part of the functionalities of a BS (e.g., access point (AP), base station (BS) or (e)Node B (eNB), gNB, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a /centralized unit (CU) and/or a distributed unit (DU) in the case of a split BS or split gNB), or other network node.

According to an illustrative example, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node or network node (e.g., BS, eNB, gNB, CU/DU, . . . ) may forward data to the UE that is received from a network or the core network, and/or forward data received from the UE to the network or core network. RAN nodes or network nodes (e.g., BS, eNB, gNB, CU/DU, . . . ) may perform a wide variety of other wireless functions or services, e.g., such as broadcasting control information (e.g., such as system information or on-demand system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform.

A user device (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network.

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network.

In addition, the techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)-related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to a eMBB UE (or an eMBB application running on a UE).

The techniques described herein may be applied to a wide variety of wireless technologies or wireless networks, such as LTE, LTE-A, 5G (New Radio (NR)), cmWave, and/or mmWave band networks, IoT, MTC, eMTC, eMBB, URLLC, etc., or any other wireless network or wireless technology. These example networks, technologies or data service types are provided only as illustrative examples.

In some cases, a UE positioning procedure may be used to determine a location or geographic position of a UE (or mobile device) or of an asset that is being tracked. In some examples, UE positioning may be performed or determined based on reference signals, such as positioning reference signals (PRSs). Some example positioning procedures may include Time Difference of Arrival (TDOA), such as downlink-TDOA (DL-TDOA), DL (downlink) Angle of Departure (DL-AoD), multi-round trip time (multi-RTT) positioning, or other positioning or location techniques. Applications or use cases may exist or arise where the network may track a location of a UE(s) or asset. As part of a positioning procedure, a UE, or other device, may measure and report measured signal parameter(s) of reference signals (e.g., DL PRS signals), to allow a network to track the UE's (and thus the asset's) location (or position). There may exist applications or uses where it may be useful to track a (e.g., geographic) position of an asset, such as tracking a position of a valuable object, tracking a package or container shipment, employee badge tracking, etc.

Due to the increasing number of wirelessly connected devices or gadgets (e.g., such as due to the Internet-of-Things (IoT) paradigm), new energy efficient communication techniques and devices are being developed. According to an example implementation, ambient backscatter communications may be used as a low power communication technique in which a backscatter node (which may also be referred to as a backscatter tag or backscatter device) may receive an ambient (or surrounding) wireless signal (e.g., that may have been transmitted to another wireless device), and then may reflect the received ambient signal. For example, backscatter communications may take advantage of existing or surrounding wireless signals by reflecting the ambient or existing wireless signal(s) to communicate between devices while using very little power. Thus, for example, ambient (or surrounding) wireless signals may be repurposed into both a source of power (e.g., to power one or more electronic devices on a wireless sensor node or wireless backscatter device) and a communication medium. According to an example embodiment, ambient backscatter communication may allow a backscatter node to reflect a received ambient signal while modulating data onto the reflected signal. For example, the reflected backscatter signal may be modulated using active (or switched) load modulation in which the load of the antenna (of the transmitting backscatter device) is varied or changed, which may allow different data values (e.g., different phases) to be applied to the reflected signal, e.g., such as either an in-phase bit or signal, or an out-of-phase bit or signal (in the simple case of a bi-polar signal), depending on the load applied to the antenna.

Global positioning system (GPS) is the dominant technology for locating outdoor devices, users etc. The reason for this success is that the localization targets passively listen to time synchronized signals emitted from several satellites. The localization targets do not transmit any signal and only process the signals received from multiple satellites. This makes the system energy efficient from the localization target's perspective. The system is scalable to an infinite number of localization targets (GPS receivers) as long as they are in the vicinity of the signals from at least three satellites. However, GPS is known to suffer from low accuracy in urban densely populated areas and indoors due to signal blockages, multipath propagation and non-line-of-sight effects.

New applications may require indoor asset tracking systems to provide accurate indoor asset or device tracking, which may not be suitable for GPS tracking. Asset tracking applications may require tracking of device or asset tracking for machinery and devices in shop floors, bin tracking, product tracking and person tracking, for example. The required positioning accuracy for mobile objects in a factory floor may be, for example, smaller than about 50 cm according to 3GPP TS. In some cases, a typical indoor positioning system may require at least three base stations (BSs or gNBs) to perform a trilateration at the receiver node using methods like time of arrival (ToA), time difference of arrival (TDoA), angle of arrival (AoA) or reference signal received power (RSRP) or signal strength-based methods. At least for some applications, a backscatter communication system may preferred for asset or device tracking (e.g., instead of active transmission via cellular networks) to improve energy efficiency, decrease device costs, and reduce human intervention or maintenance (e.g., such as changing batteries for devices or UEs being tracked).

The techniques described here may use a backscatter communication system as the underlying infrastructure for positioning UEs, mobile devices or assets. A backscatter communication system may include a radio frequency (RF) (or wireless signal) source, a backscatter transmitter and a backscatter receiver. The RF (or wireless signal) source emits RF (or wireless) signals to activate a backscatter node functioning as a backscatter transmitter. Then, the backscatter transmitter modulates and reflects the incoming RF signals to the tag operating as the backscatter receiver rather than self-generating the RF (or wireless) signals. As the backscatter transmitter operates in a passive communication mode by simply modulating and reflecting the incoming RF or wireless energy, the energy consumption (or amount of power required by backscatter transmitter to modulate and reflect the received signal) may be very low which is the main benefit of this configuration.

For example, a backscatter communication system may function in two main configurations: monostatic and bistatic. In a monostatic configuration, the RF (or ambient wireless signal) source and the backscatter receiver are (or may be) co-located (e.g., attached or connected, or provided at the same location or position). The backscatter transmitter is (or may be) physically separated. This is the most common configuration found in radio frequency identification (RFID) backscatter systems. In a bistatic configuration, the RF source, backscatter transmitter and backscatter receiver are at different physical locations. This configuration can use either a dedicated RF source for active transmission or an already existing ambient source such as a cellular base station, television tower, WiFi or other wireless signal source.

A backscatter transmitter may be configured to reflect the incoming signals from an RF (or wireless signal) source through impedance mismatching. This is achieved by alternating the antenna impedance to switch between absorbing and reflection states via load modulation which causes the reflected signal's envelope to have different amplitude levels. This allows the backscatter transmitter to modulate information bits to the reflected signal. The backscatter receiver interprets the absorbing and reflecting states as modulations of different information bits. During the reflection operation, the backscatter transmitter can change both the amplitude and phase of the incoming signal. To change the frequency of the reflected signal the backscatter tag needs to change the reflection coefficient to approximate a sinusoid. The sinusoid represents a single tone signal which then shifts the frequency of the incoming signal. The main advantage of using a backscatter node (or backscatter tag) for backscatter communication (e.g., backscatter modulation and reflection) is the energy efficiency and low cost compared to active transmitters. The backscatter nodes or backscatter tags do not contain energy consuming oscillators, can be charged through received RF or wireless signals, and can go to sleep mode to save the energy. Thus, backscatter communications may advantageously be used for UE, mobile device or asset tracking.

A typical indoor positioning system may require, for example, at least three base stations to perform a trilateration at the receiver node using methods like time of arrival (ToA), time difference of arrival (TDoA), angle of arrival (AoA) or received signal strength-based methods. However, in some cases, it may be challenging for multiple base stations to have overlapping coverage in a cellular system. In some cases, large antenna arrays with multiple beams, map assisted localization and intelligence reflecting surfaces (IRS) have been proposed as single base station positioning methods. However, these type of systems may be complex expensive, and may not necessarily provide accurate positioning.

Thus, to provide improved performance, a positioning system may be provided that may use sidelink communications between UEs (user devices). Sidelink communications may refer to a direct communication between UEs, rather than UEs communicating via a network node or gNB. A gNB may allocate time-frequency resources for sidelink communications. Therefore, a positioning system described herein may use or leverage the sidelink communications between UEs for positioning assets or backscatter node or tag (e.g., where an asset may be co-located with a backscatter node or backscatter tag). For example, using the sidelink not only helps to perform the positioning of assets or backscatter nodes, e.g., based on trilateration or even multilateration of the asset using multiple UEs, it also helps to position assets in areas with low base station coverage or where the base station signal is weak.

Figure 2:
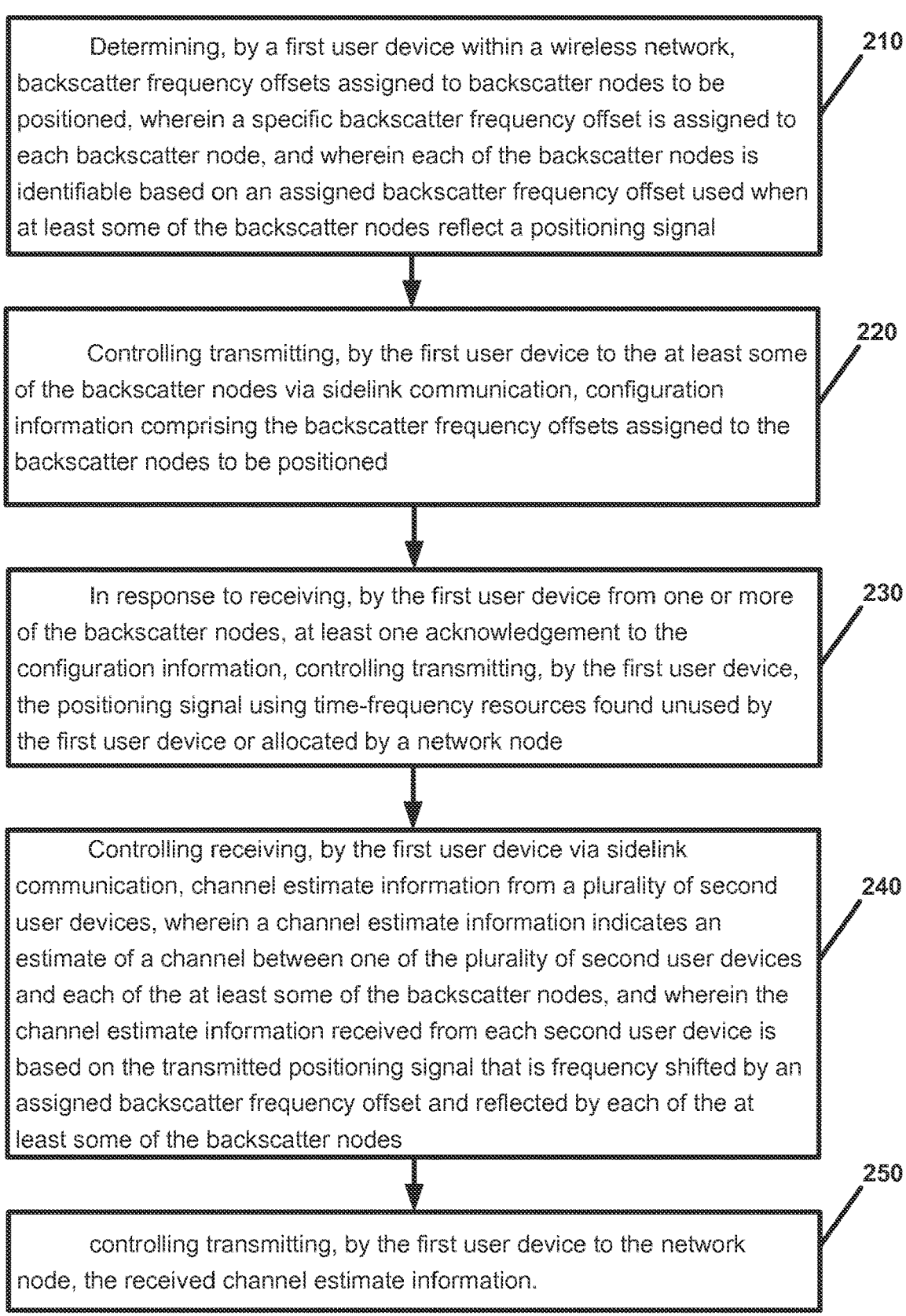
FIG. 2 is a flow chart illustrating operation of a user device (or UE) according to an example embodiment.

FIG. 2 is a flow chart illustrating operation of a user device (or UE) according to an example embodiment. Operation 210 includes determining, by a first user device within a wireless network, backscatter frequency offsets assigned to backscatter nodes to be positioned, wherein a specific backscatter frequency offset is assigned to each backscatter node, and wherein each of the backscatter nodes is identifiable based on an assigned backscatter frequency offset used when at least some of the backscatter nodes reflect a positioning signal. Operation 220 includes controlling transmitting, by the first user device to the at least some of the backscatter nodes via sidelink communication, configuration information comprising the backscatter frequency offsets assigned to the backscatter nodes to be positioned. Operation 230 includes, in response to receiving, by the first user device from one or more of the backscatter nodes, at least one acknowledgement to the configuration information, controlling transmitting, by the first user device, the positioning signal using time-frequency resources found unused by the first user device or allocated by a network node. Operation 240 includes controlling receiving, by the first user device via sidelink communication, channel estimate information from a plurality of second user devices, wherein a channel estimate information indicates an estimate of a channel between one of the plurality of second user devices and each of the at least some of the backscatter nodes, and wherein the channel estimate information received from each second user device is based on the transmitted positioning signal that is frequency shifted by an assigned backscatter frequency offset and reflected by each of the at least some of the backscatter nodes. And, operation 250 includes controlling transmitting, by the first user device to the network node, the received channel estimate information.

Therefore, with respect to FIG. 2 and other Figures, a first user device may, for example, be an initiator UE (initiator user device), where the initiator UE may perform one or more functions or control operations (e.g., such as transmitting a reference signal via sidelink communications) related to a positioning procedure to assist in obtaining measurements (such as channel estimate information), e.g., via sidelink communications, that may be used by a LMF or other positioning control entity to determine a location or position of the one or more backscatter nodes. As noted above, each of the backscatter nodes (or backscatter tags) may be co-located with an asset that is being tracked, for example. Thus, it may be desirable to determine, from time to time, a location or position of the backscatter nodes (backscatter tags). The initiator UE may determine backscatter frequency offsets assigned to the backscatter nodes, wherein each of the backscatter nodes is identifiable based on an assigned backscatter frequency offset. The initiator UE may transmit configuration information via sidelink communications to the one or more backscatter nodes or tags, e.g., indicating the backscatter frequency offsets assigned to each backscatter node. Also, the initiator UE, in response to receiving at least one acknowledgement from one or more backscatter nodes (e.g., that acknowledges receipt of the configuration information), may transmit a positioning signal (e.g., a reference signal that may be shifted and reflected, and used for positioning), e.g., using time-frequency resources that were found by the initiator UE unused or vacant within sidelink communication resources, or allocated by a network node. Therefore, in some cases, the initiator UE may also obtain time-frequency resources, e.g., from a network node (e.g., gNB, CU, DU, BS) for transmission of a positioning signal (e.g., which may be a reference signal that may be used for positioning a UE) via sidelink (e.g., UE-to-UE, or a direct UE transmission without going through a network node or gNB) communications. Or, the initiator UE may itself determine vacant or unused time-frequency resources for transmission of a positioning signal. The initiator UE, in some cases, may also either request and receive from a serving gNB, or may determine, backscatter frequency offsets, which may be frequency offsets for one or more vacant or unused sidelink channels that the backscatter nodes may use to transmit (e.g., frequency shift and reflect a received reference signal) a backscatter signal. The initiator UE may, for example, in some cases, receive an acknowledgement, e.g., via a backscatter signal from the one or more backscatter nodes, acknowledging or confirming that the backscatter node received the configuration information (e.g., including backscatter frequency offsets assigned to the one or more backscatter nodes). The initiator UE (e.g., the first user device in the method of FIG. 2) may transmit the positioning (e.g., reference) signal via the obtained time-frequency resources via sidelink communications. The backscatter nodes (or backscatter tags) may frequency shift (by an assigned backscatter frequency offset) and reflect the received reference signal, via sidelink channels (via a sidelink channel corresponding to an assigned backscatter frequency offset). One or more UEs (e.g., non-initiator UEs, such as the second user device in method of FIG. 2, and possibly the initiator UE or first user device) may receive the backscatter signal (e.g., the frequency shifted and reflected reference signal) transmitted by one or more backscatter nodes, and may measure (or determine) channel estimate information based on the received backscatter signal, for the channel between each of the one or more backscatter nodes and the measuring UE. Each of the measuring UEs (UEs that receive the backscatter signal and determine channel estimate information) may then send (or transmit) their channel estimate information to the initiator UE (e.g., to the first user device in method of FIG. 2). Measuring UEs may also (or alternatively) send their channel estimate information directly to the LMF via the gNB, without being forwarded to the initiator UE. Thus, in the method of FIG. 2, the initiator UE (e.g., first user device) may receive, via sidelink communication, channel estimate information from a plurality of second (measuring) UEs, wherein the channel estimate information received from each second user device (or from measuring UEs) is based on the transmitted positioning signal that is frequency shifted by an assigned backscatter frequency offset and reflected by each of the at least some of the backscatter nodes. The initiator UE (e.g., the first user device in the method of FIG. 2) may send the received channel estimate information to a network node, e.g., to allow a LMF or other positioning control entity to determine a location of at least some of the backscatter nodes. The LMF may use trilateration or other positioning procedure to determine a location or position of each of one or more backscatter nodes (backscatter tags) or assets.

With respect to the method of FIG. 2, the method may further include controlling receiving, by the first user device from the network node, a positioning request for the backscatter nodes to be positioned.

With respect to the method of FIG. 2, the backscatter frequency offset assigned to each of the backscatter nodes identifies a vacant or unoccupied sidelink channel to be used by a backscatter node to transmit a backscatter signal, wherein the backscatter signal transmitted by a backscatter node comprises the positioning signal that is frequency shifted by an assigned backscatter node-specific frequency offset and reflected by the backscatter node.

With respect to the method of FIG. 2, the channel estimate information comprises information of a channel frequency response that includes at least one of phase information or timing information based on the positioning signal that is frequency shifted by an assigned backscatter frequency offset and reflected by each of the at least some of the backscatter nodes.

With respect to the method of FIG. 2, the determining backscatter frequency offsets assigned to backscatter nodes to be positioned comprises the first user device performing at least one of: receiving, by the first user device from the network node, a list of the backscatter nodes to be positioned and a backscatter frequency offset assigned to each of the backscatter nodes to be positioned; or performing the following by the first user device: determining the backscatter nodes to be positioned; identifying a set of backscatter frequency offsets that are associated with vacant or unused time-frequency resources for sidelink communication; and assigning a backscatter frequency offset, of the set of backscatter frequency offsets, to each of the backscatter nodes to be positioned.

With respect to the method of FIG. 2, the controlling transmitting configuration information comprises: controlling transmitting, by the first user device to at least some of the backscatter nodes to be positioned via sidelink communication, a wakeup signal to cause the at least some of the backscatter nodes to be positioned to wake up from a low power state, a synchronization signal, and the configuration information including at least the backscatter frequency offsets assigned to the backscatter nodes.

With respect to the method of FIG. 2, the controlling transmitting the positioning signal comprises: receiving, by the first user device from at least one of the backscatter nodes to be positioned, an acknowledgement that the configuration information was received; and controlling transmitting, by the first user device, a positioning reference signal in response to receiving the acknowledgement from the at least one of the backscatter nodes to be positioned.

With respect to the method of FIG. 2, the reference signal comprises a first reference signal, the method further comprising: in response to receiving a request from the network node, switching responsibilities, from the first user device to one of the second user devices, for transmission of a second positioning signal as part of a positioning procedure to position the backscatter nodes to be positioned.

With respect to the method of FIG. 2, the method further including controlling receiving, by a first user device, a backscatter signal from at least some of the backscatter nodes, wherein each of the backscatter signals is based on the second positioning signal that has been frequency shifted by an assigned backscatter frequency offset and reflected by each of at least some of the backscatter nodes to be positioned; determining, by the first user device based on a backscatter signal received from at least some of the backscatter nodes to be positioned, channel estimate information that indicates an estimate of a channel between the first user device and each of the at least some of the backscatter nodes to be positioned, and wherein the channel estimate information is based on the transmitted second positioning signal that is frequency shifted by an assigned backscatter frequency offset and reflected by each of the at least some of the backscatter nodes to be positioned; and controlling transmitting, by the first user device to the one of the second user devices via sidelink communication, the channel estimate information determined by the first user device.

Figure 3:
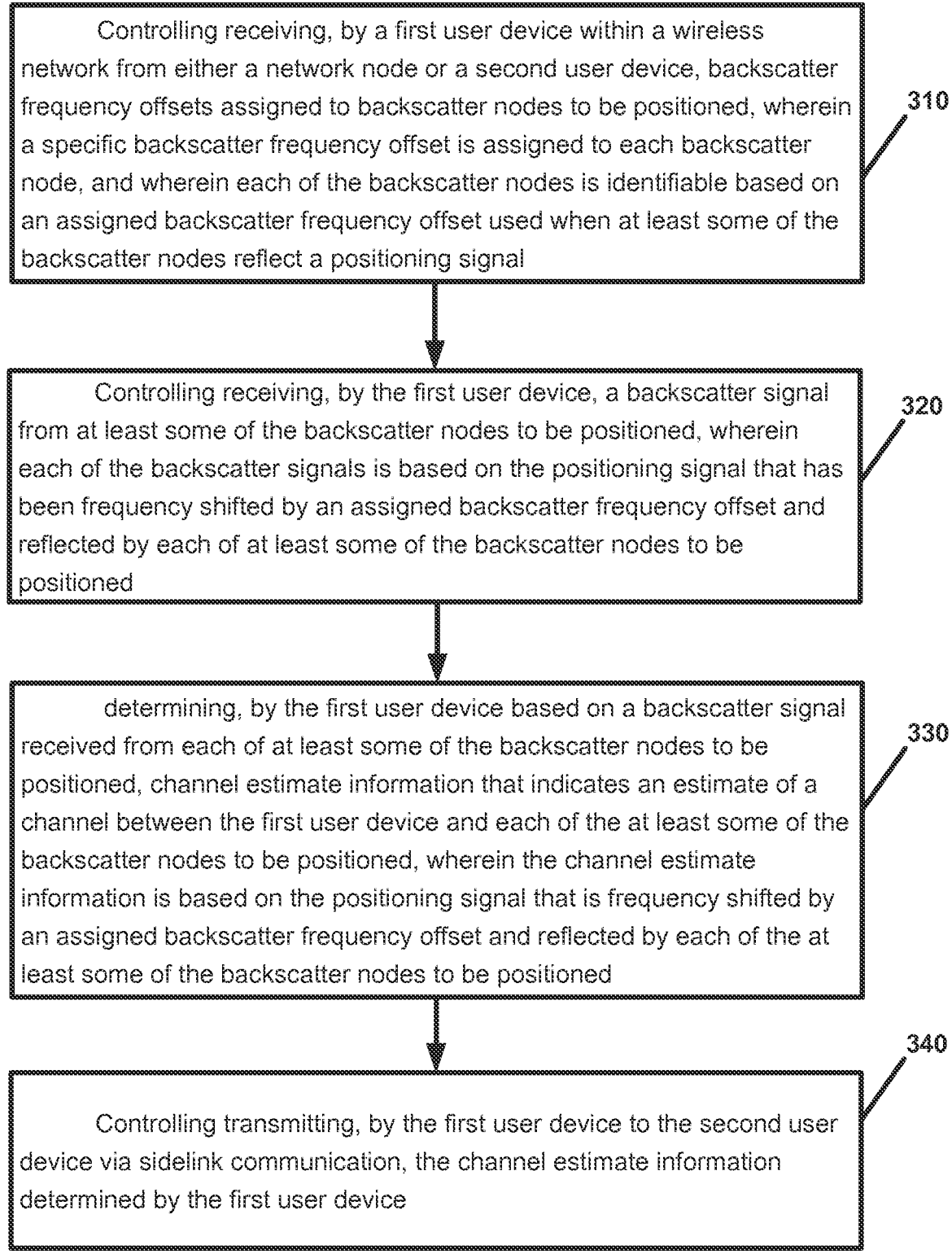
FIG. 3 is a flow chart illustrating operation of a user device or UE according to an example embodiment.

FIG. 3 is a flow chart illustrating operation of a user device or UE according to an example embodiment. Operation 310 of the method of FIG. 3 includes controlling receiving, by a first user device within a wireless network from either a network node or a second user device, backscatter frequency offsets assigned to backscatter nodes to be positioned, wherein a specific backscatter frequency offset is assigned to each backscatter node, and wherein each of the backscatter nodes is identifiable based on an assigned backscatter frequency offset used when at least some of the backscatter nodes reflect a positioning signal. Operation 320 includes controlling receiving, by the first user device, a backscatter signal from at least some of the backscatter nodes to be positioned, wherein each of the backscatter signals is based on the positioning signal that has been frequency shifted by an assigned backscatter frequency offset and reflected by each of at least some of the backscatter nodes to be positioned. Operation 330 includes determining, by the first user device based on a backscatter signal received from each of at least some of the backscatter nodes to be positioned, channel estimate information that indicates an estimate of a channel between the first user device and each of the at least some of the backscatter nodes to be positioned, wherein the channel estimate information is based on the positioning signal that is frequency shifted by an assigned backscatter frequency offset and reflected by each of the at least some of the backscatter nodes to be positioned. And, operation 340 includes controlling transmitting, by the first user device to the second user device via sidelink communication, the channel estimate information determined by the first user device.

The operation illustrated in FIG. 3 may, for example, describe the operation of a non-initiator UE that may receive backscatter frequency offsets assigned to backscatter nodes to be positioned, wherein a specific backscatter frequency offset is assigned to each backscatter node, and wherein each of the backscatter nodes is identifiable based on an assigned backscatter frequency offset used when at least some of the backscatter nodes reflect a positioning signal. The non-initiator UE (the first user device in FIG. 3) may receive (e.g., via a vacant sidelink channel corresponding to a backscatter frequency offset assigned to the backscatter node) a backscatter signal (a frequency shifted and reflected reference signal), and may measure or determine channel estimate information for a backscatter node-UE channel based on the received backscatter signal. The non-initiator UE (e.g., the first user device in FIG. 3) may then report, via sidelink communications, the channel estimate information to an initiator UE (e.g., the second user device in FIG. 3). Or, alternatively, measuring UEs may send their channel estimate information to LMF via gNB (without going through, or without being sent through, the initiator UE). The UE initiator role or function(s) may then be switched, to allow the second user device (which previously was a non-initiator UE), to assume or perform one or more initiator UE functions. For example, although not part of method of FIG. 3, in some cases, initiator UE functions may include one or more of, e.g., determining and/or transmitting configuration information (e.g., including frequency offsets assigned to backscatter nodes), determining resources for a positioning signal, and transmitting another reference signal via sidelink communications to be frequency shifted and reflected by the one or more backscatter nodes or tags.

With respect to the method of FIG. 3, the method may include receiving, by the first user device from the second user device, the positioning signal, wherein the positioning signal comprises a reference signal used for positioning the backscatter nodes to be positioned.

With respect to the method of FIG. 3, the channel estimate information comprises information of a channel frequency response that includes at least one of phase information or timing information based on the positioning signal that is frequency shifted by an assigned backscatter frequency offset and reflected by each of the at least some of the backscatter nodes.

With respect to the method of FIG. 3, the backscatter frequency offset assigned to each of the backscatter nodes identifies a vacant or unoccupied sidelink channel to be used by a backscatter node to transmit a backscatter signal, wherein the backscatter signal transmitted by a backscatter node comprises the positioning signal that is frequency shifted by an assigned backscatter node-specific frequency offset and reflected by the backscatter node.

FIG. 4 is a flow chart illustrating operation of a network node (e.g., base station, gNB, DU) according to an example embodiment. The network node may configure UEs and/or backscatter nodes, and may also receive channel estimate information from one or more UEs, as part of a positioning procedure to allow a location or position of one or more backscatter nodes to be determined, e.g., by a LMF or other positioning control entity.

With respect to FIG. 4, operation 410 includes determining, by a network node within a wireless network, time-frequency resources for transmission of a positioning signal by a first user device via sidelink communications, and backscatter frequency offsets assigned to backscatter nodes to be positioned, wherein a specific backscatter frequency offset is assigned to each backscatter node to be positioned, and wherein each of the backscatter nodes to be positioned is identifiable based on an assigned backscatter frequency offset used when at least some of the backscatter nodes reflect the positioning signal. Operation 420 includes controlling transmitting, by the network node to the first user device, the time-frequency resources for transmission of the positioning signal by the first user device via sidelink communication, and information identifying the backscatter frequency offsets assigned to the backscatter nodes to be positioned. Operation 430 includes controlling transmitting, by the network node to a plurality of second user devices, the information identifying the backscatter frequency offsets assigned to the backscatter nodes to be positioned, for the second user devices to receive a backscatter signal from at least some of the backscatter nodes to be positioned, wherein each of the backscatter signals is based on the positioning signal that has been frequency shifted by an assigned backscatter frequency offset and reflected by each of at least some of the backscatter nodes to be positioned. And, operation 440 includes controlling receiving by the network node from the first user device, channel estimate information determined by each of the plurality of second user devices, wherein the channel estimate information indicates an estimate of a channel between one of the plurality of second user devices and each of the at least some of the backscatter nodes to be positioned, wherein the channel estimate information is based on the positioning signal that is frequency shifted by an assigned backscatter frequency offset and reflected by each of the at least some of the backscatter nodes to be positioned.

The following text and FIGS. 5-15, describe various features, examples and details that may be provided or performed for the methods of FIGS. 2-4.

In an illustrative example, a 5G base station (e.g., gNB) and UEs may be used to position (determine a position or location of) backscatter nodes or backscatter tags that are attached to assets that require tracking. For example, these backscatter nodes or tag and the assets may be in a warehouse or a factory environment. The advantage of techniques or methods described herein is that multiple backscatter nodes can be positioned (determine a position or location of such backscatter nodes or tags) simultaneously using existing 5G base stations (gNBs, DU, etc.) and UEs. The base station or gNB may be used, for example, for waking up and configuring the UEs and backscatter nodes. The UEs may be used for positioning the backscatter nodes by transmitting a positioning reference signal, and then one or more UEs measuring signal parameter(s) of the backscatter signals. Also, using the sidelink for positioning the backscatter nodes may assist or provide advantages in several ways: i) Due to low transmit power, the UEs can wake up and position the backscatter nodes in its neighborhood (that are nearby). This may reduce the power consumption of the backscatter nodes or tags due to unnecessary wake ups; and, ii) Using multiple UEs may reduce the deadzones (e.g., where there are no nearby UEs to receive backscatter signals from a backscatter node in that area), and thus, may provide a more accurate location estimate of the backscatter nodes. Thus, the use of sidelink communications, e.g., for transmission of reference signal, for transmission of a backscatter signal, and/or for a UE to report channel estimate information to an initiator UE, may allow for improved network coverage of backscatter node positioning (e.g., since more UEs may be provided closer to the backscatter nodes), and may improve the accuracy of the backscatter node positioning (e.g., via use of the UEs or sidelink communications, more signal measurements or channel state information may be measured by more UEs and/or for more backscatter nodes).

An example system may use backscatter nodes or backscatter tags in a bistatic configuration. The backscatter nodes or tags may include have a backscatter transmitter, a backscatter receiver and an energy harvester collocated. The backscatter nodes can be programmed to shift the frequency (by an assigned backscatter frequency offset) of the incoming signal to a nearby vacant sidelink channel, where a backscatter frequency offset may be assigned to each of the backscatter nodes or tags. Thus, the backscatter frequency offset or sidelink channel used for transmission of the backscatter signal may be unique to each backscatter node or tag, which may avoid co-channel interference among backscatter (or frequency shifted and reflected) signals and may be used to identify the backscatter node that transmitted a backscatter signal. The positions of the backscatter nodes are not known (as the system is determining a position or location of the backscatter nodes), but the positions or location of the UEs with sidelink communication enabled are known. The terms position and location may be used herein interchangeably.

Thus, for example, a network node (e.g., gNB, DU or base station) may transmit or send backscatter node (or tag) related information such as backscatter node identifiers (or tag IDs) and their assigned backscatter frequency offsets to the UEs via Radio Resource Control (RRC) signalling. The network node (e.g., gNB or base station) or the initiator UE may transmit or send a special ambient backscatter wake-up signal to wakeup the backscatter nodes, a synchronization signal to allow the backscatter nodes or tags to synchronize to the initiator UE, and configuration information such as the backscatter frequency offset assigned to each of the one or more backscatter nodes. The transmission of the reference signal (and thus possible transmission of frequency shifted and reflected signal by backscatter nodes, may be periodic or aperiodic. If periodic, all UEs know when to monitor for the reflected signal. If aperiodic, other UEs are needed to be informed about the possible wake up of the backscatter node or tag, which can be informed by the base station or by an initiator UE via the sidelink communications. An initiator UE may transmit a reference signal, such as a PRS, the backscatter nodes or tags perform a frequency shift by an assigned backscatter frequency offset and reflect a received reference signal, and other UEs (e.g., at least non-initiator UEs) may measure the PRS in multiple channels (e.g., within the assigned sidelink channels (or backscatter frequency offsets) assigned to each backscatter node or tag. The initiator role may be switched, rotated or changed among the UEs, and then the process may be repeated with the new initiator UE, to improve the location estimation accuracy of the system. Thus, for example, the UEs and backscatter nodes may form a wireless network (e.g., via sidelink communications or UE direct transmissions) to position the backscatter nodes, and thus extend the range of positioning coverage. An initiator UE may act as a signal source, may wakeup UEs and/or backscatter nodes, and may configure UEs and/or backscatter nodes with the backscatter frequency offsets (or vacant or unoccupied sidelink channels) assigned to each of the backscatter nodes. Thus, the system may include overall operations of i) configuration of the UEs and the backscatter nodes (at least part of which may occur via sidelink communications), and ii) the positioning of backscatter nodes using the sidelink communications.

For example, the positioning of the backscatter nodes or tags may occur based on (or in response to), e.g., either a request from a client or a periodic location update procedure. A cellular base station or gNB may initiate the positioning procedure by requesting a UE (e.g., an initiator UE) to localize the specific set of backscatter nodes or tags. Initially, the backscatter nodes may be in a sleeping or low power state and UEs may be in the idle state to save energy. The gNB or network node may transmit a position request to a UE, designated as initiator UE. Either the network node (e.g., gNB) or the initiator UE identifies the vacant or unoccupied channels for sidelink communication and the backscatter nodes for the frequency shift, and other UEs to monitor these channels for frequency shifted and reflected PRSs. The initiator UE may act as a wireless ambient signal source, wakes up the backscatter nodes and transmits configuration messages to the backscatter nodes or tags with the assigned backscatter frequency offsets to the vacant sidelink channels. The backscatter nodes wake up and synchronize to the initiator UE and configure their frequency shifts to an assigned backscatter frequency offset upon receiving the broadcast message.

Once the configuration of a backscatter node or tag is completed (e.g., configuring the frequency shift for a backscatter node to an assigned backscatter frequency offset), the backscatter nodes may send acknowledgements to the initiator UE to confirm receipt of the configuration information. Thus, an initiator UE may transmit to backscatter nodes a wakeup signal, configuration information indicating assigned backscatter frequency offsets for each backscatter node. A backscatter node may transmit or send an acknowledgement (ACK) to the initiator UE by modulating and reflecting the configuration message received from initiator UE. When the initiator UE receives the acknowledgements, the initiator UE may broadcast a positioning signal, such as a positioning reference signal (PRS), to the backscatter nodes or tags (backscatter nodes are now awake and have configured backscatter frequency offsets, and should receive the positioning (e.g., PRS) signal from initiator UE), the backscatter nodes frequency shift and reflect this PRS signal. The (e.g., non-initiator) UEs receive the backscatter signals from one or more backscatter nodes and may determine or calculate channel estimate information (e.g., phase information and/or timing information) for a backscatter node-UE channel, e.g., by performing a correlation for each of one or more of the backscatter frequency offsets or sidelink channels assigned to the backscatter nodes to obtain backscatter signals with a peak or amplitude greater than a threshold, and then determining phase information and/or timing information (e.g., relative phase of received backscatter signal, and/or a time or timing of occurrence of a correlation peak for each of the backscatter frequency offsets or sidelink channels) for the one or more backscatter signals. The measuring UE may forward its channel estimate information to the initiator UE, so that this information may be used (e.g., by a LMF, or positioning control entity) to determine a position or location of each of the one or more backscatter nodes or tags. Different positioning procedures or positioning techniques may be used, and may rely on different channel estimate information. For example, phase information may be used for AoA (angle or arrival) positioning and/or time information may be used for ToA (time of arrival) positioning, and this channel state information may be forwarded to the initiator UE. Or, alternatively, each measuring (non-initiator UE) may send or transmit its channel estimate information to a LMF via a serving network node or gNB (rather than forwarding such channel estimate information to the initiator UE). The initiator (or initiating) UE forwards the channel estimates or channel estimate information to the location management function (LMF) (or other positioning control entity), and the LMF may determine or compute the positions of the backscatter nodes, and the positions may be forwarded to a client, application, or other node. The LMF may use the received channel estimate information and the known positions of the UEs (e.g., positions of the measuring UEs and/or initiator UEs) for estimating the backscatter node positions. Using the channel estimates information, the LMF may determine or compute a joint direction of arrival, time of arrival-based estimation of the positions or locations of the backscatter nodes or tags.

Figure 5:
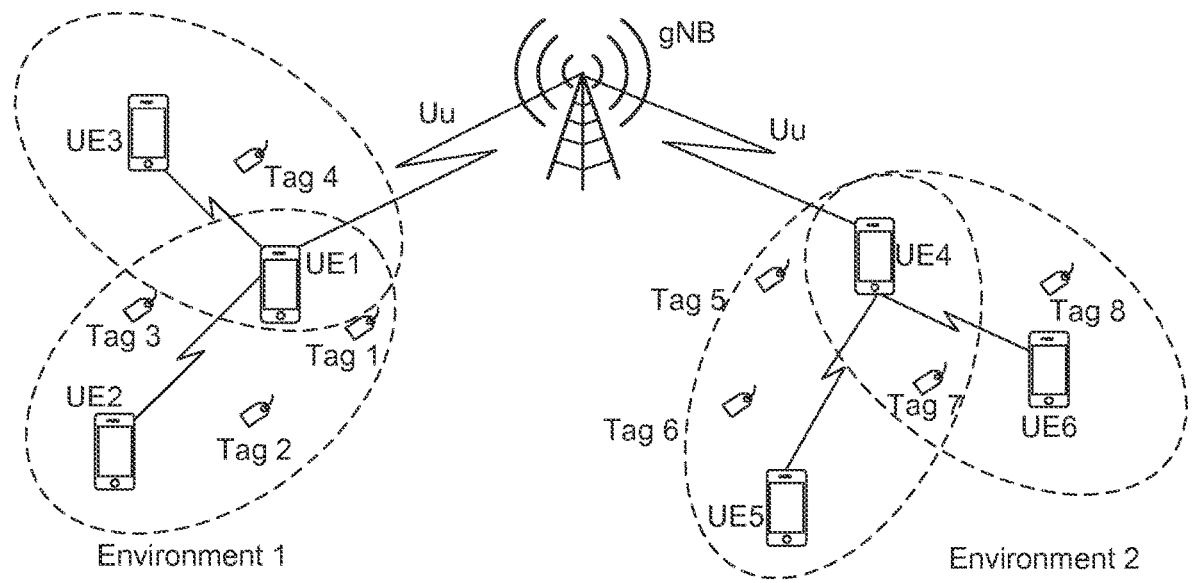
FIG. 5 is a diagram illustrating a system according to an example embodiment.

FIG. 5 is a diagram illustrating a system according to an example embodiment. FIG. 5 shows two exemplary environments, which, e.g., may be a factory environment and/or a warehouse. At least one UE (e.g., an initiator UE) from each environment connects to the gNB and exchanges information regarding the positions of the assets. The assets that are being tracked are attached with backscatter nodes (backscatter tags). The backscatter nodes or tags may include a collocated backscatter receiver, a backscatter transmitter that can shift the frequency of the incoming signal to a different channel and reflect the frequency shifted signal, and an energy harvester to collect the ambient wireless energy to power the backscatter node (or tag). The UEs may use the sidelink to communicate with each other and communicate with the backscatter nodes or tags and for locating the backscatter nodes or tags. Thus, the UEs may act as the wireless or RF power source for the backscatter nodes or tags. The positions of the backscatter nodes or tags are not known, but the positions of the UEs are known.

Thus, for example, as shown in FIG. 5, for environment 1, UE1, UE2 and UE3 are provided, along with multiple backscatter nodes or tags, including, e.g., Tag1 (or backscatter node 1), Tag2 (or backscatter node 2), Tag3 (or backscatter node 3) and Tag4 (backscatter node 4). UE1, UE2 and UE3 may communicate via sidelink communications (direct UE to UE communications). For example, UE1 may initially be an initiator UE for environment 1, and may determine or obtain from gNB time-frequency resources to transmit a positioning reference signal, and may determine or obtain backscatter frequency offsets (corresponding to vacant or unoccupied sidelink channels) to be assigned to each of the one or more backscatter nodes or tags (Tag1, Tag2, Tag3, Tag4) for transmission of a backscatter signal. Initiator UE1 may send information via sidelink communications to UE2 and UE3 to indicate the backscatter frequency offsets or vacant sidelink channels that are assigned to backscatter nodes or tags, and which should be monitored by the UEs for backscatter signals. Initiator UE1 may also send, via sidelink communications, a wakeup signal, synchronization signal, and configuration information to the backscatter nodes or tags, and may receive an acknowledgement from the tags that they received this configuration information. The initiator UE1 may transmit a PRS signal via sidelink communications, which may be frequency shifted by an assigned backscatter frequency offset and reflected by one or more of backscatter nodes or tags Tag1 (backscatter node 1), Tag2 (backscatter node 2), Tag3 (backscatter node 3), Tag4 (backscatter node 4). UE1, UE2 and/or UE3 may receive and perform correlation on received backscatter signals from each of the tags (e.g., at each of the assigned backscatter frequency offsets assigned to backscatter nodes). UE2 and UE3 may report their channel estimate information (e.g., phase, timing, amplitude or other signal parameter describing a tag-UE channel) to the initiator UE1. Initiator UE1 may then send a message to an LMF or other positioning control entity via the gNB to report the channel estimate information received by the initiator UE1.

With respect to FIG. 5, the role of initiator UE may then switch from UE1 to another UE (e.g., to UE2) within environment 1, where UE2 may then repeat one or more operations that were performed by initiator UE1, e.g., obtain or determine resources for PRS, determine backscatter frequency offsets or vacant sidelink channels to be assigned to tags or backscatter nodes, configure UEs and/or backscatter nodes with the backscatter frequency offsets, transmit the PRS, receive channel estimate information from the other (e.g., non-initiator) UEs of UE1, UE3, and forward or report the channel estimate information to gNB or to LMF for calculation of a position or location of the backscatter nodes or tags. Environment 2 may include a similar situation, e.g., with multiple UEs, such as UE4, UE5 and UE6, and multiple tags or backscatter nodes such as Tag5, Tag6, Tag7, Tag8, etc.

Figure 6:
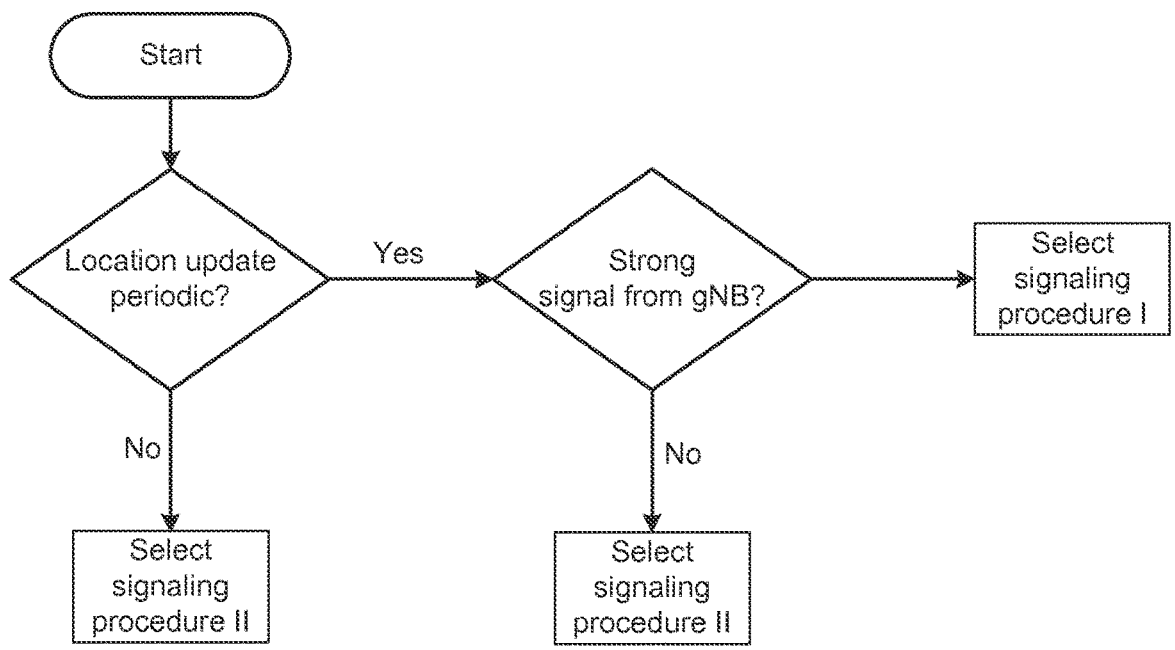
FIG. 6 is a diagram illustrating a process of determining which of multiple signalling procedures may be used to perform backscatter node positioning.
Figure 7:
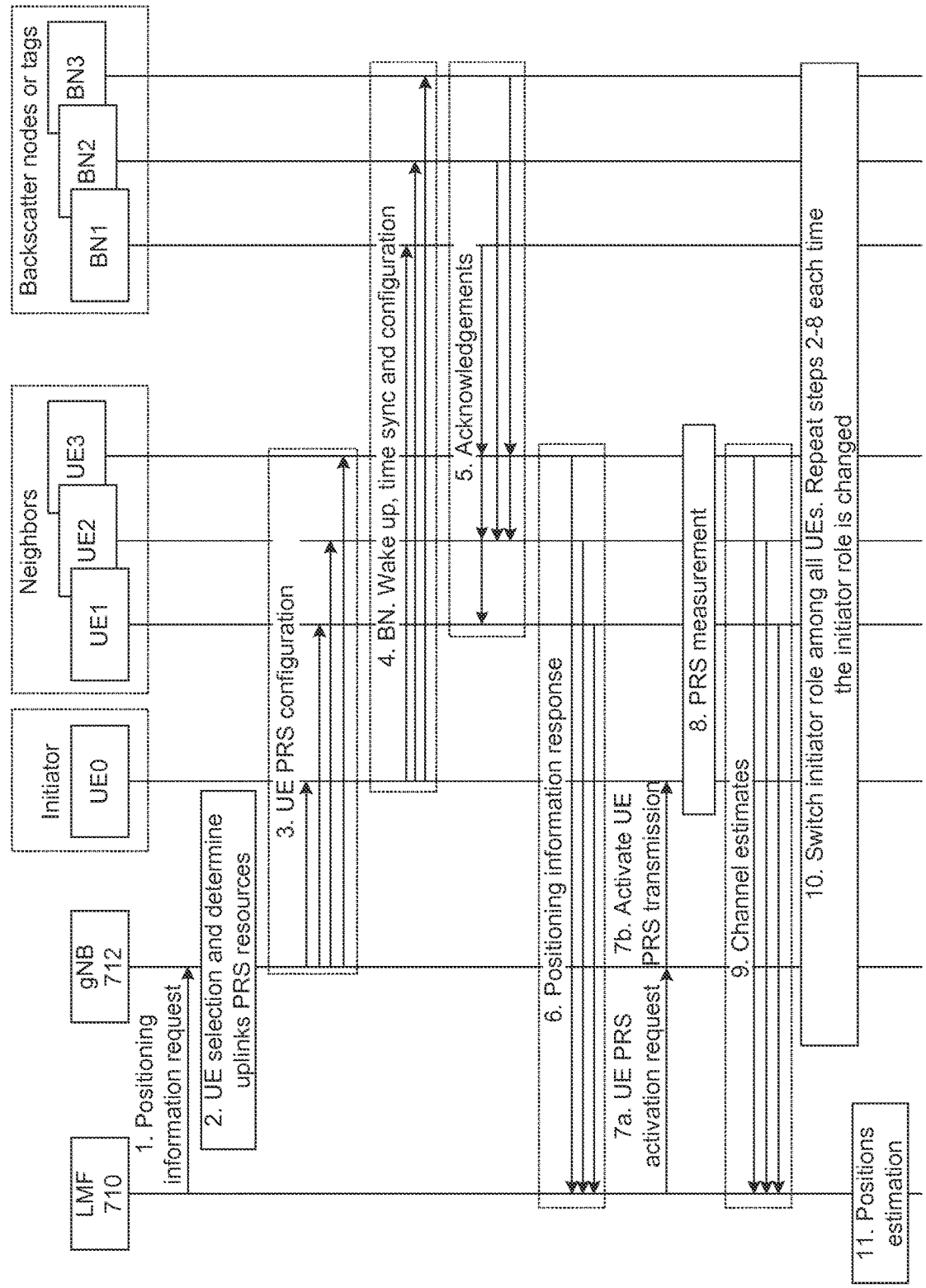
FIG. 7 is a diagram illustrating an example signalling procedure for positioning in which a network node (or gNB) may be used.
Figure 11:
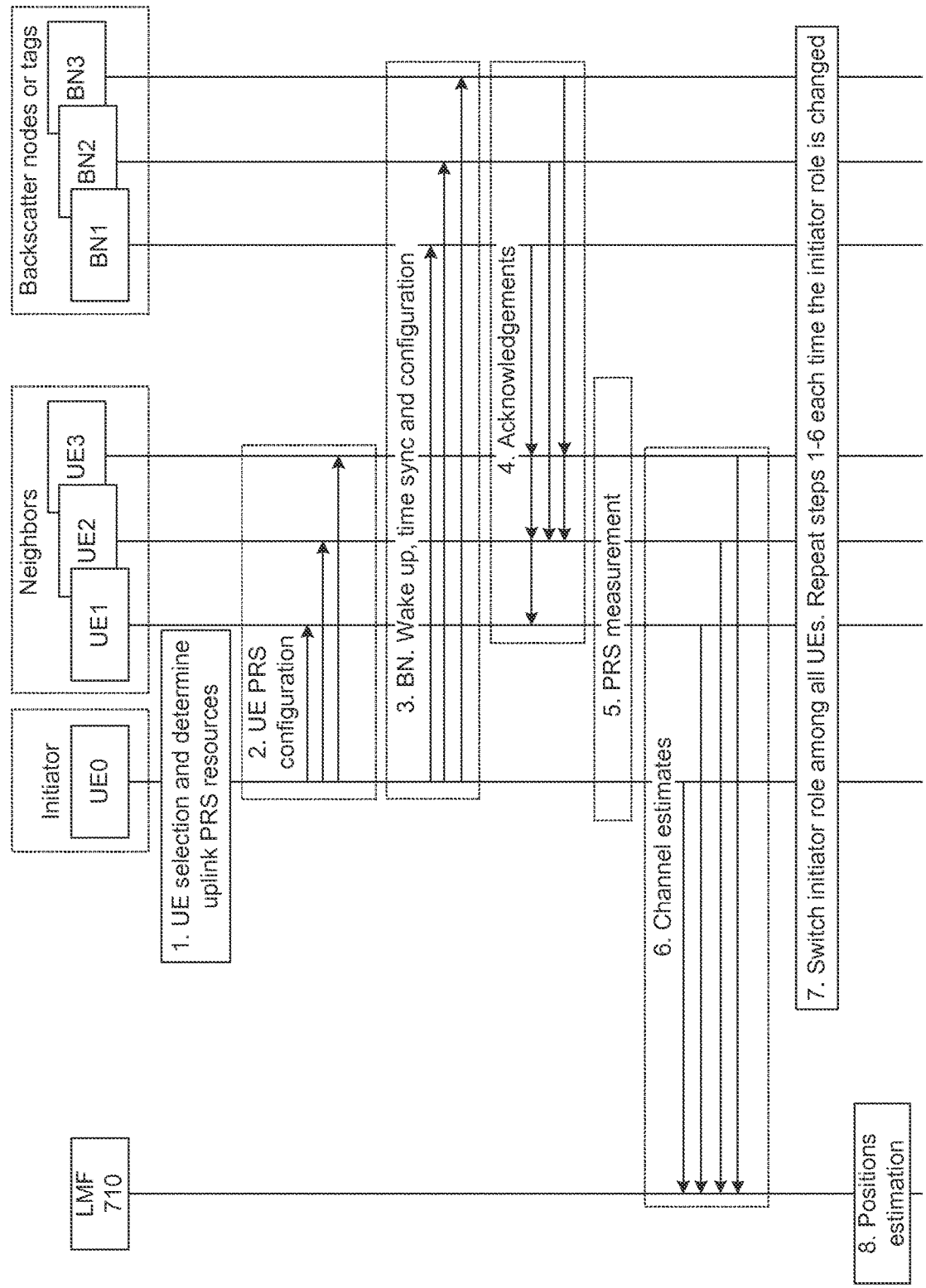
FIG. 11 is a diagram illustrating an example signalling procedure for positioning in which a network node (or gNB) is not used.

FIG. 6 is a diagram illustrating a process of determining which of multiple signalling procedures may be used to perform backscatter node positioning. As can be seen from the example flow of FIG. 6, if a UE does not receive a strong signal from a gNB (or network node), or if the location update is not periodic (but may be aperiodic or on demand), then a signalling procedure II may be used in which a gNB or network node is unnecessary. Otherwise, if the UE detects a strong signal from a network node or gNB, then the UE may use signalling procedure I that may rely on or use information obtained from the gNB or network node. FIG. 7 is an example of a signalling procedure I in which a gNB or network node may be present and may be used as part of a positioning procedure, while FIG. 11 is an example of a signalling procedure II in which a gNB is not available to a UE, or is not necessarily used as part of the positioning procedure.

FIG. 7 is a diagram illustrating an example signalling procedure for positioning in which a network node (or gNB) may be used. A location management function (LMF) 710 may be in communication with a network node or gNB 712. gNB 712 may be in communication with UEs, such as UE0 (an initiator UE in this example), and additional (non-initiator) UEs, such as UE1, UE2, UE3, . . . Backscatter nodes or tags are also provided, including backscatter node 1 (BN1), BN2, BN3.

1) (FIG. 7) Positioning information request: When the LMF 710 receives a position request from a client (an application or node that is requesting position or location of an asset or backscatter node(s)), LMF 710 selects the positioning method and assistance data for locating the assets. The assistance data may include the identifiers (IDs) and previous locations of the UEs and the backscatter nodes. The LMF 710 sends a positioning information request to the serving gNB 712 along with all or part of the assistance data to request UL-PRS (uplink positioning reference signal) configuration information for the initiator UE (UE0) and determine uplink PRS resources.

Figure 8:
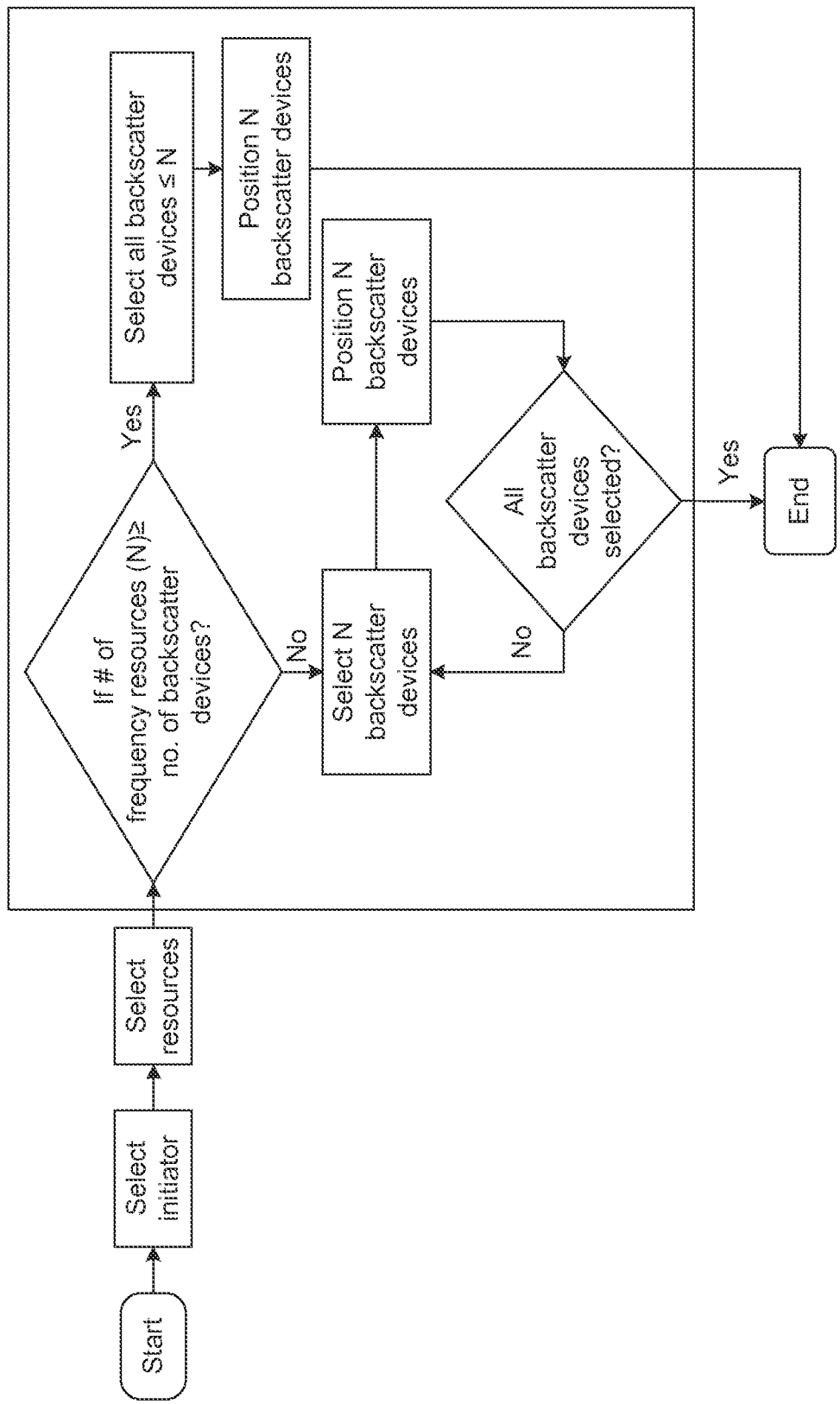
FIG. 8 is a flow chart illustrating allocation of frequency resources to backscatter nodes according to an example embodiment.

2) (FIG. 7) gNB selection and determine uplink/sidelink positioning signal (e.g., PRS) resources: The serving gNB 712 selects the initiator UE (UE0), e.g., which may be a nearest UE to itself from the collection of UEs that serve the backscatter nodes using the assistance data that the LMF 710 sends. The gNB 712 may determine the time-frequency resources for positioning signal (e.g., uplink-PRS) transmission (e.g., sidelink resources) for locating the backscatter nodes or tags (BN1, BN2, BN3, . . . ). These resources may include the time and frequency resources that the initiator UE (UE0) uses to transmit the PRS, and the frequency resources (e.g., vacant or unoccupied sidelink channels corresponding to backscatter frequency offsets) the backscatter nodes may use to frequency shift and reflect the incoming PRS. FIG. 8 is a flow chart illustrating allocation of frequency resources to backscatter nodes according to an example embodiment. There may be, for example, three types of resource allocation scenarios here, e.g., for allocating sidelink channels or backscatter frequency offset (frequency resources) for backscatter nodes to use for frequency shifting and reflection of a received PRS. For example, the frequency resources (e.g., the number of vacant or unoccupied sidelink channels that are available for backscatter transmission) available can be either greater than, equal or less than the number of available backscatter nodes. In these three scenarios, the gNB 712 may assigns the frequency resources (e.g., backscatter frequency offsets or vacant sidelink channels) to the backscatter nodes, e.g., in increasing order of the frequency. Next, the gNB 712 selects the neighbour UEs in the target area. If the number of available frequency resources (number of available sidelink channels) for backscatter transmission is greater than or equal to the number of backscatter nodes, then one frequency resource or sidelink channel may be assigned to each backscatter node or tag. If there are insufficient frequency resources or vacant sidelink channels, then the N frequency resources may be assigned to a selected group of N backscatter nodes, where the frequency resources may be used to frequency shift and reflect a received PRS signal, for positioning the selected group of N backscatter nodes. After that group of N backscatter nodes has been positioned (e.g., backscatter signals have been received, and channel estimate information determined and forwarded to initiator UE0 for backscatter node positioning), then some or all of the frequency resources (or vacant sidelink channels) may be reassigned to a new group of N backscatter nodes, to allow positioning of the new group of backscatter nodes to be performed based on frequency shifting and reflection of a PRS signal via the reassigned frequency resources or vacant sidelink channels. This process may be repeated, in which frequency resources may be assigned, used for positioning, and the reassigned to a new group of backscatter nodes, until positioning has been performed for all backscatter nodes or tags in the network or environment.

3) (FIG. 7) gNB PRS configuration: The serving gNB may send a positioning request to the initiator UE. The serving gNB 712 configures the initiator UE (UE0) with the UL-PRS resources and configures the selected UEs to monitor the channels during aperiodic wake-up.

Thus, at 3), gNB 712 may send a message to UE0, UE1, UE2, and UE3 to indicate the time-frequency resources over which UE0 may transmit a PRS signal. Also, gNB 712 may also indicate to the UEs the backscatter frequency offsets (or vacant sidelink channels) that are assigned to each of the backscatter nodes or tags. Initiator UE0 will transmit the PRS signal using the time-frequency resources, and at least the non-initiator UEs (UE1, UE2, UE3) may monitor the indicated backscatter frequency offsets or vacant sidelink channels to receive and perform correlation on each sidelink channel to receive or detect the backscatter signals transmitted by the backscatter nodes BN1, BN2, BN3.

Figure 10:
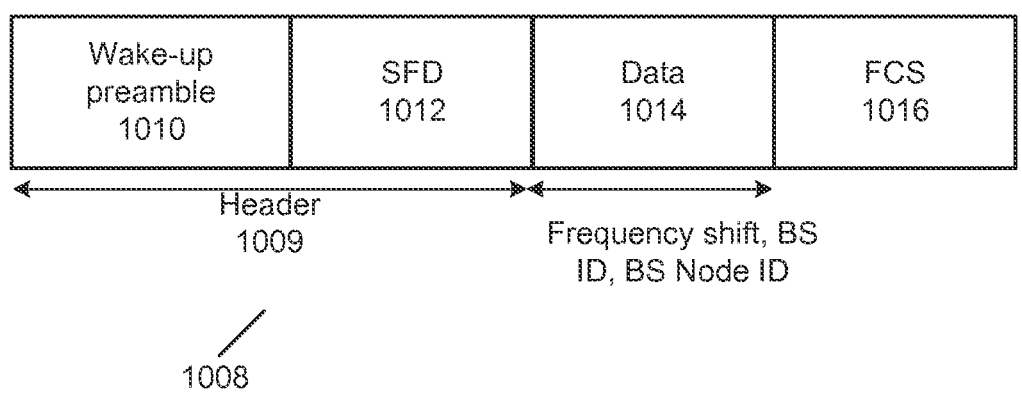
FIG. 10 is a diagram that shows this process of waking up the hardware of the backscatter node.

4) Initiator UE transmission of wakeup, synchronization and configuration information to backscatter nodes.: The initiator UE (UE0 in this example) may use the sidelink to send a message to wake up the backscatter nodes, provide synchronization signal (to allow the backscatter nodes to perform synchronization to the initiator UE) and provide configuration information that indicates the assigned frequency shifts or vacant sidelink channels assigned to each of the one or more backscatter nodes or tags (the backscatter node-specific frequency offsets assigned to each backscatter node). The backscatter nodes or tags may then configure themselves to perform frequency shift to their assigned backscatter frequency offset, to frequency shift and reflect a received signal. For example, the initiator UE (UE0) may use ON-OFF keying on top of OFDM (orthogonal frequency division multiplexing) modulation to send the bit sequences in a packet, e.g., in order to communicate the wakeup signal, the synchronization signal, and the backscatter frequency offset assignment to the backscatter nodes. The backscatter frequency offset assigned to each of the backscatter nodes identifies a vacant or unoccupied sidelink channel to be used by a backscatter node to transmit a backscatter signal, wherein the backscatter signal transmitted by a backscatter node comprises the positioning signal that is frequency shifted by an assigned backscatter node-specific frequency offset and reflected by the backscatter node To wake up the backscatter devices, the UE sends a signal with alternating 0s and 1s up to 8 bits. The comparator hardware in the backscatter device uses a voltage threshold of −22 dBm to detect the bit transitions from 0 to 1. Once the bit transitions are detected, the correlation process may be used by the backscatter node to detect the preamble sent by the UE. When the preamble is detected, an interrupt is sent to wake up the hardware from the idle state. FIG. 10 is a diagram that shows this process of waking up the hardware of the backscatter node. After a fixed delay, the UE may send the source and destination addresses in the form of a header, in the current situation, the destination is the backscatter nodes that are awake, thus, it is a broadcast message. Finally, the body of the message may include the backscatter frequency offsets assigned to each of the backscatter nodes and the respective backscatter node IDs. After the UE sends the wake up signal, the UE may wait a specific amount of time, and then may send the message or packet that includes the configuration information.

Figure 9:
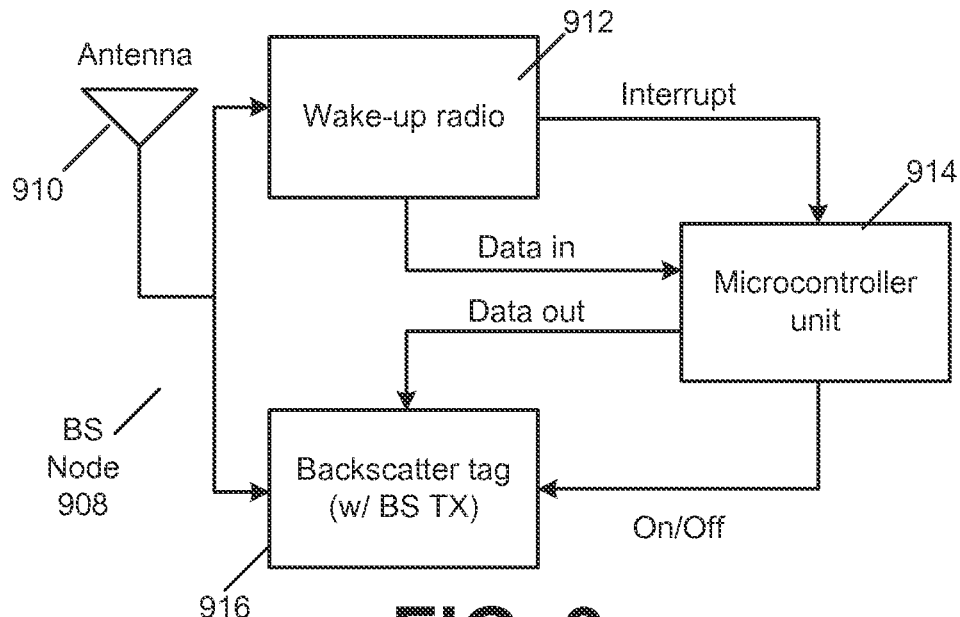
FIG. 9 is a block diagram illustrating an example of a backscatter node (e.g., backscatter tag).

FIG. 9 is a block diagram illustrating an example of a backscatter node (e.g., backscatter tag). Backscatter node 908 (e.g., BN1) may include an antenna 910, a wake-up radio 912, a microcontroller unit 914, and a backscatter tag (including a backscatter transmitter) 916. FIG. 9 illustrates how a wake-up signal may be used to wake up and configure a backscatter node or backscatter tag. The backscatter tag (or backscatter transmitter) 916 and the wake-up radio 912 use the same frequency; hence, they share the same antenna. First, the wake-up radio 912 may detect a preamble signal from the network node or gNB 712 (FIG. 7), and decodes the configuration information in the signal. When it detects the wake-up signal in the packet, an interrupt is sent to the microcontroller unit 914 to wake up the backscatter tag 916. The configuration information may include, for example, the address of the backscatter tag 916, and the backscatter frequency offset or frequency shift that is assigned to the backscatter tag 916. This configuration information may also be sent to the microcontroller unit 914 through the data channel (data in), shown in FIG. 9. When the network node or gNB 712 wants to wake up all (or many of) the backscatter tags, the gNB 712 may use a broadcast-based wake-up (e.g., may broadcast a wake-up signal to all tags or backscatter nodes). If gNB 712 (FIG. 7) wants to wake up a subset of the tags or a particular tag, the gNB 712 may use an address-based wake-up signal(s). Waking up a neighborhood of tags is performed to enable only the selected backscatter tags or backscatter nodes. Single tag waking up may be performed to configure the tag such as the backscatter frequency offset or frequency shift assigned to the backscatter tag or backscatter node. The wake-up radio may always be powered (in an on or operational state) and waits for the wake-up signal. Microcontroller unit 914 may be provided in a low power or sleep state, until receiving an interrupt from the wake-up radio 912.

FIG. 10 is a diagram illustrating a packet of a wake-up signal that may be transmitted by a network node (e.g., BS, gNB, DU). The wakeup (and configuration) packet 1008 may include a packet header 1009, data 1014, and a frame check sequence (FCS) 1016. The packet header 1009 may include a wake-up preamble 1010 and a start frame delimiter (SFD) 1012. The preamble 1010 allows the transmitter and receiver to synchronize the bit intervals and the SFD 1012 indicates the start of the data field (1014) of the packet 1008. The data field 1014 may indicate or include a configuration, e.g., such as indicating a network node or gNB ID to identify the gNB, base station or network node, or a UEID that identifies the UE that is transmitting the packet 1008, a backscatter node ID (BS node ID or tag ID), and a backscatter frequency offset (frequency shift) that is being assigned to the backscatter node or backscatter tag. A neighborhood or group ID (identifier) may be included, if the wakeup packet is addressed to a group of backscatter nodes or all backscatter nodes. If there is no ID in the packet, this may indicate a broadcast-based wake-up. Finally, to correct any errors in the packet due to effects of the channel, a frame check sequence (FCS) 1016 is included based on cyclic redundancy check is implemented. Also, for example, a network node (e.g., base station (BS) or gNB or DU) that acts as the wake-up transmitter may modulate a wake-up signal (e.g., wake-up packet 1008) using on-off-keying (OOK). In OOK modulation, for example, the preamble signal information may be transmitted using '0's and '1's. When the base station sends a '1', it emits a large carrier amplitude and when a '0' is sent the transmitter is turned off. This technique is rather simple and efficient on the energy consumption of the network node (gNB or base station) as it saves the transmit power on sending '0's. At the receiver end, the OOK signal is detected from a rising edge of the digital signal indicating a transition of low to high that is interpreted as a valid signal has been received.

5) (FIG. 7) Acknowledgements from backscatter nodes:
The initiator UE (UE0) may transmit or emit a continuous wave signal, e.g., using OFDM such that the backscatter tags may modulate, shift to the assigned frequencies, and reflect the signal back with acknowledgement that the configuration was successful. The UEs (e.g., UE0 to UE3) may receive the reflected responses (acknowledgements) from the backscatter tags. There is no guarantee that all the neighbour UEs receive the acknowledgement due to weak signal strength, in some cases.

6) (FIG. 7) Positioning information response: The UEs forward the tag IDs (backscatter node identifiers) of the backscatter nodes that the acknowledgements were received by UEs, to the serving gNB 712. The serving gNB 712 forwards the tag IDs and the UL information to the LMF 710 in a positioning information response message.

7a) (FIG. 7) UE PRS activation request: The LMF 710 requests activation of UE PRS transmission and sends a PRS activation request message to the serving gNB of the target device.

7b) (FIG. 7) Activate UE PRS transmission: The gNB 712 activates the UE's PRS transmission. The initiator UE (UE0) performs the positioning (e.g., PRS) signal transmission according to the time domain behavior of PRS resource configuration using the sidelink (e.g., initiator UE transmits PRS signal via time-frequency resources of sidelink channel, that have been allocated by gNB 712 for PRS transmission).

8) (FIG. 7) PRS measurement: The backscatter nodes shift the frequency of the incoming (received) PRS (from the initiator UE) to their assigned backscatter frequency offsets or assigned channels and reflect the frequency shifted signal. Non-initiator or neighbor UEs receive backscatter (frequency shifted and reflected) signals from one or more backscatter nodes. The non-initiator or neighboring UEs monitor (e.g., perform correlation on each of the channels) the assigned channels (channels or time-frequency resources associated with different backscatter frequency offsets) and estimate the channels that exceed a reference signal received power (RSRP) threshold of ≥−100 dBm. The neighboring UEs receive the original PRS sent by the initiator UE and the frequency shifted PRSs from the backscatter tags. The UEs that receive the PRSs estimate the respective channels (backscatter node-UE channel) from all the antennas. Estimating the UE-backscatter channel may include determining channel estimate information, which may include one or more signal measurements or parameters that may describe the channel frequency response of the channel between the backscatter node and the measuring UE. For example, channel estimate information may include phase information and/or time or timing (e.g., a time of a correlation peak for each backscatter frequency offset or channel). Or, correlation may be performed to determine a phase (or phase difference) at each antenna of the reflected PRS signal, for each backscatter frequency offset or channel. For example, the reflected PRS may be compared to the original or directly received PRS, to determine a channel estimate. Thus, phase, timing or time, and/or amplitude or other parameter may be determined or measured as part of the channel estimate information, which may provide a channel estimate for the backscatter node-UE channel. The channel estimate information may be used to determine or estimate a location or position of a backscatter node or tag, e.g., since the positions of the UEs are known.

9) (FIG. 7) Channel estimates: The UEs measure the channel estimates (determine channel estimation information) based on the received backscatter (frequency shifted and reflected) signals received from the backscatter nodes. The UEs (e.g., non-initiator UEs, such as UE1, UE2, UE3) may send their channel estimate information to the initiator UE (UE0). The initiator UE (UE0) may also determine channel estimate information for the backscatter node-UE0 channel based on the received reflected signal. The initiator UE (UE0) may then send to the gNB 712 and/or LMF 710, the received channel estimate information (e.g., received from other UEs, and possibly also its own measured channel estimate information), for one or more UEs, and one or more backscatter nodes, and send those estimates to the LMF for position estimation. Alternatively, each UE may directly send its measured channel estimate information to gNB 712 and/or LMF 710.

10) (FIG. 7) Switch or rotate the initiator UE role to another UE. The gNB 712 (or other entity or node(s)) may assign the initiator UE role to another UE, e.g., to the next closest UE (e.g., UE1). Steps 2 to 8 (FIG. 7) may then be repeated, with UE1 being the initiator UE (e.g., obtaining time-frequency resources for a PRS transmission over sidelink communications, determining or obtaining backscatter frequency offsets or vacant sidelink channels assigned to each backscatter nodes, configuring the backscatter nodes with their assigned backscatter frequency offsets, transmitting the positioning (e.g., PRS signal) via sidelink communication, receiving measured channel estimate information from non-initiator UEs (e.g., UE0, UE2, UE3), and then forwarding the received channel estimate information to the gNB 712 and/or LMF 710. This switching of initiator role may be switched, e.g., because the responses (backscatter signals) of the backscatter nodes may be relatively weak, and not all of the backscatter signal responses from the backscatter nodes may be received using only one initiator UE (that transmits the PRS signal), depending on the coverage of the UEs from a single iteration (using only one initiator UE). Therefore, several iterations may be done to improve the coverage, e.g., by allowing different UEs to transmit the positioning or PRS signal, and thus, allowing a different set/subset of non-initiator UEs to receive and measure channel estimate information based on the frequency shifted and reflected PRS signals.

11) (FIG. 7) Position Estimation. Upon receiving all the channel estimates (channel estimate information) from all the iterations (e.g., from multiple UEs and/or for different backscatter node-UE links, as forwarded by different initiator UEs), the gNB 712 and/or LMF 710 may compute or determine the positions of the backscatter nodes and may send a message to the client, application or node that requested the positions or locations of the backscatter nodes or tags. Alternatively, the gNB 712 may simply forward the measured channel estimates to a positioning control entity, such as the LMF. Thus, the gNB 712 may: determine, based on the received channel estimate information, a position of at least some of the backscatter nodes; or, forward the channel estimate information to a positioning control entity (e.g., LMF 710), for the positioning control entity to determine positions of at least some of the backscatter nodes.

FIG. 11 is a diagram illustrating an example signalling procedure for positioning in which a network node (or gNB) is not used, or may not be available.

1) (FIG. 11) UE selection and determine uplink PRS resources: In the absence of a network node (gNB or base station) (or in a case where this procedure does not rely on a network node), the initiator UE may be selected from human operator preference or agreement among the UEs in the neighborhood (e.g., based on communication among UEs in a cell or area via sidelink communication), based on a default (or preconfigured) configuration, or using another technique. The initiator UE (UE0 in this example) scans the available channels (e.g., channels to find the vacant (or unused or unoccupied) time-frequency resources based on the relative received power in each channel. These resources include the time and frequency resources that the initiator UE uses to send the PRS and the frequency resources that the backscatter nodes may use to frequency shift and reflect (or transmit) the incoming PRS (at different frequency offsets assigned to each backscatter node). The initiator UE (UE0) may measure the RSSI (reference signal strength indication) or energy on the available channels in 1000 subframes and may sort the channels in descending order of the energy levels. It then chooses the energy resources <−60 dBm and assigns them to the backscatter devices. Initiator UE (UE0) may assign the frequency resources starting with the lowest energy levels to the backscatter devices (e.g., since the lowest energy or RSSI levels may indicate channels available for sidelink communication that are presently vacant or unused). There may be three types of resource allocation scenarios here. The frequency resources available can be either greater than, equal or less than the number of available backscatter devices. In these three scenarios, the initiator UE assigns them to the backscatter devices, e.g. in increasing order of the frequency. Next, the initiator UE selects the neighbor UEs in the target area, e.g., one or more nearest neighbor UEs.

2) (FIG. 11) UE PRS configuration: The initiator UE (e.g., UE0 in this example) configures the neighboring UEs to monitor the selected channels. For example, the initiator UE may configure the selected UEs to monitor the channels during aperiodic wake-up. Thus, at 2), initiator UE (UE0) may send a message to UE1, UE2, and UE3 to indicate the time-frequency resources over which UE0 may transmit a PRS signal. Also, initiator UE (UE0) may also indicate to the UEs the backscatter frequency offsets (or vacant sidelink channels) that are assigned to each of the backscatter nodes or tags. Initiator UE0 will transmit the PRS signal using the time-frequency resources, and at least the non-initiator UEs (UE1, UE2, UE3) may monitor the indicated backscatter frequency offsets or vacant sidelink channels to receive the backscatter signals from backscatter nodes or tags, and may perform correlation on each sidelink channel (or for each frequency offset) to receive or detect the backscatter signals transmitted by the backscatter nodes BN1, BN2, BN3.

Operations 3)-8) in FIG. 11 are the same or may be similar to or the same as the operations 4), 5) and 8)-11), respectively, of FIG. 7.

Figure 12:
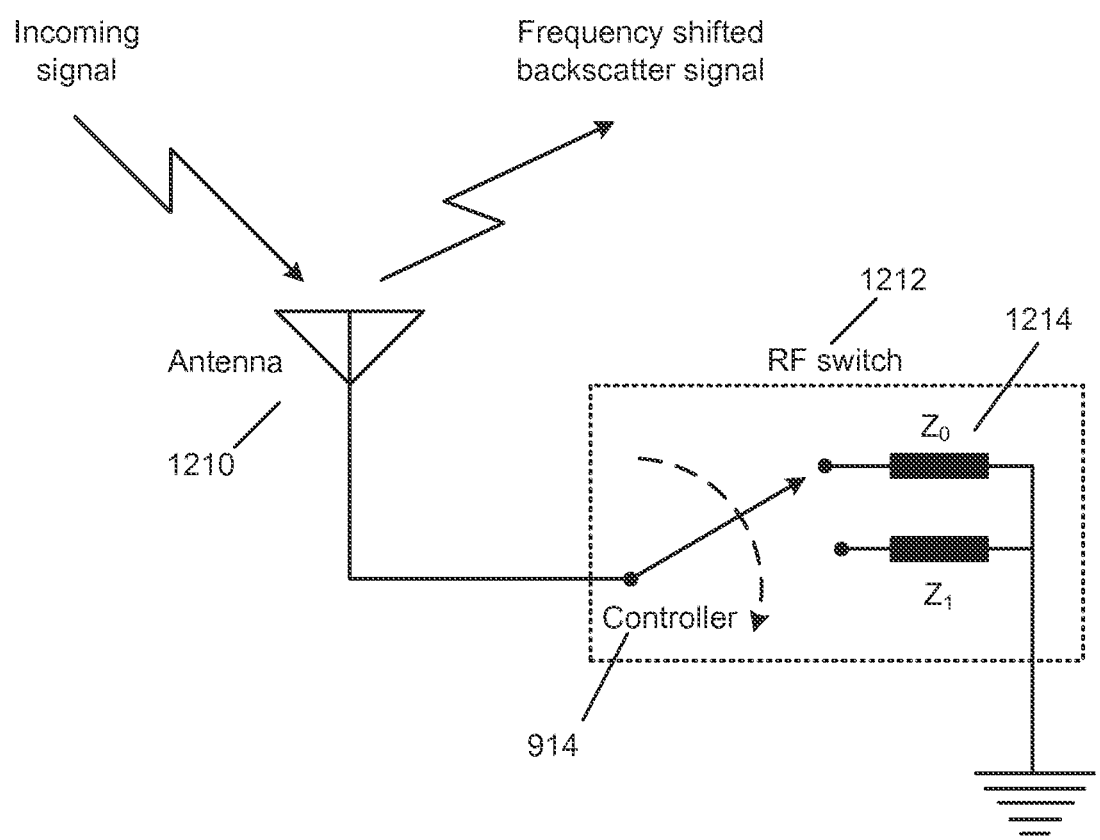
FIG. 12 is a diagram illustrating an example of a tag or backscatter node.

FIG. 12 is a diagram illustrating an example of a tag or backscatter node. As shown in FIG. 12, the backscatter tag may include an antenna 1210, an RF (radio frequency) switch 1212, a digital controller such as an FPGA or a microcontroller unit 914 (see also FIG. 9), and impedance loads 1214 ($Z_0$ and $Z_1$) to change the reflection coefficient of the antenna. The backscatter tag may be powered by a coin cell or a button cell battery. To shift the frequency of the incoming signal, the backscatter tag changes the reflection coefficient of the tag over time so that the reflection coefficient approximates a sine wave. Whereas the sinusoid can be a real sine wave, here, a digital square wave signal approximates the sine wave. To generate the square wave, the RF switch 1212 connects different impedances to the antenna 1210, and the microcontroller unit 914 toggles the RF switch 1212 between impedances $Z_0$ and $Z_1$ to change the reflection coefficient. Each square wave has a unique toggling frequency which dictates the frequency shift, and each backscatter tag is identified at the receiver from this frequency shift.

Figure 13:
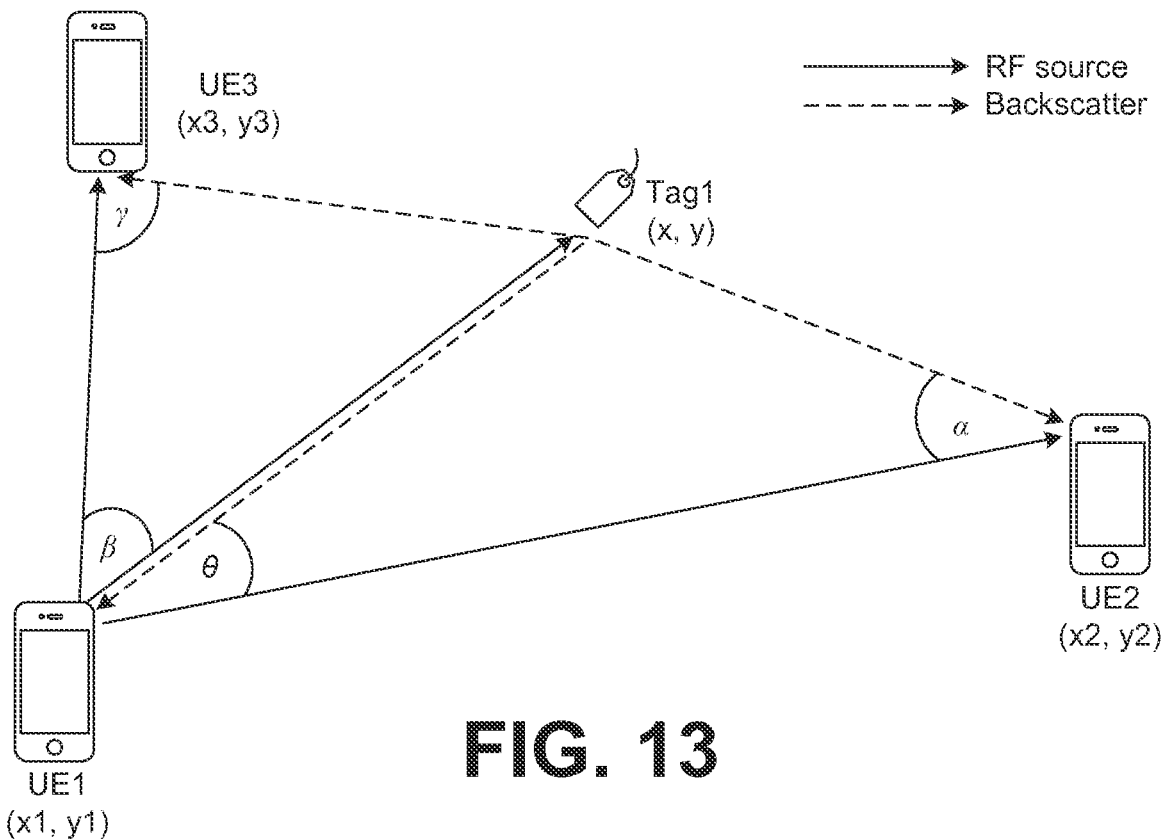
FIG. 13 shows an example localization scenario using the proposed sidelink based backscatter tag positioning approach.

FIG. 13 shows an example localization (positioning) scenario using the proposed sidelink based backscatter tag (or backscatter node) positioning approach. UE1 sends the PRS (positioning signal), in frequency f1 and Tag1 (backscatter node 1) shifts this frequency to f2 and reflects the signal. UE1, UE2 and UE3 receive the reflected signal in frequency f2 and estimate the channel. Tag1 can be positioned (location or position of Tag1 is determined) using a ToA, TDoA of AoA based approach. For an example of an AoA based approach following procedure can be used. As UE2 receives the signal directly from UE1 and then the reflected signal from Tag1, UE2 can measure the angle $\alpha$ between the two signals. Likewise, UE3 can measure angle $\gamma$. As UE1 can measure the angle $\theta$ from frequency shifted reflection signal from Tag1 and using the positions of itself ($x_1$, $y_1$) and UE2 ($x_2$, $y_2$). Finally, using the estimated angles and the positions of UE1, UE2 and UE3, the position (x, y) of Tag1 (or backscatter node 1) can be estimated. As noted, Tag 1 (or backscatter node 1) may be co-located with or attached to an asset to be tracked.

Figure 14:
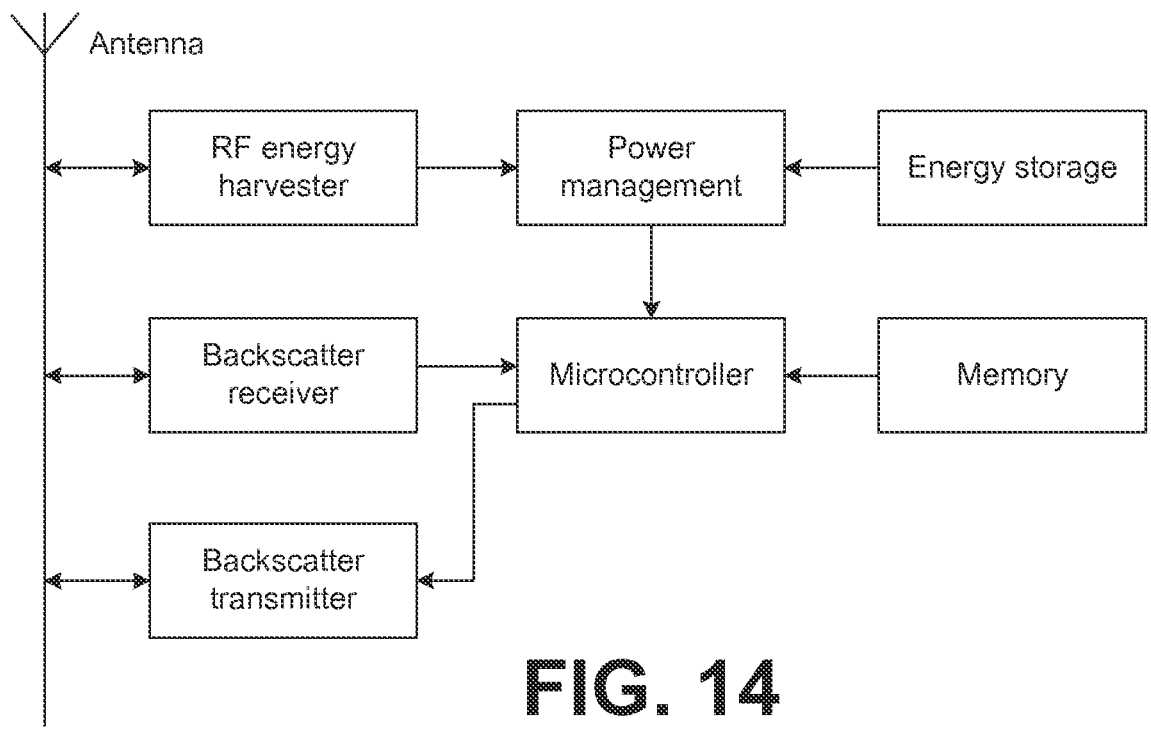
FIG. 14 is a diagram illustrating a backscatter node or tag.

FIG. 14 is a diagram illustrating a backscatter node or tag. A backscatter node or backscatter tag may include a backscatter transmitter, a backscatter receiver an RF energy harvester, power management and energy storage modules, a microcontroller and memory. The backscatter transmitter may include an RF switch, impedance loads to change the reflection coefficient of the antenna and a connection to the microcontroller. To shift the frequency of the incoming signal, the backscatter tag changes the reflection coefficient of the tag over time so that the reflection coefficient approximates a sine wave. While the sinusoid can be a real sine wave, here, a digital square wave signal approximates the sine wave. To generate the square wave, the RF switch connects different impedances to the antenna, and the controller toggles the RF switch between impedances to change the reflection coefficient. Each square wave has a unique toggling frequency which dictates the frequency shift, and each backscatter tag is identified at the receiver from this frequency shift. The backscatter receiver may include an envelope average to average out the natural variations in the OFDM signal and extract the backscatter modulated data, and a threshold detector to detect the transition boundaries. By averaging, the envelope averager smooths the incoming signals. After the threshold detector compares the amplitude with the threshold value to detect bits '1' and '0', they are passed through a decoder to derive the original data. The backscatter node or tag may be powered by a coin cell or a button cell battery and can harvest energy from the wireless channel to improve the lifetime of the device.

Example 1. A method comprising:
- determining, by a first user device within a wireless network, backscatter frequency offsets assigned to backscatter nodes to be positioned, wherein a specific backscatter frequency offset is assigned to each backscatter node, and wherein each of the backscatter nodes is identifiable based on an assigned backscatter frequency offset used when at least some of the backscatter nodes reflect a positioning signal (e.g., for FIG. 7, operation 3): gNB PRS configuration: The serving gNB 712 configures the initiator UE (UE0) with the UL-PRS resources and configures the selected UEs to monitor the channels during aperiodic wake-up. Thus, at 3), gNB 712 may send a message to UE0, UE1, UE2, and UE3 to indicate the time-frequency resources over which UE0 may transmit a PRS signal. Also, gNB 712 may also indicate to the UEs the backscatter frequency offsets (or vacant sidelink channels) that are assigned to each of the backscatter nodes or tags. Initiator UE0 will transmit the PRS signal using the time-frequency resources, and at least the non-initiator UEs (UE1, UE2, UE3) may monitor the indicated backscatter frequency offsets or vacant sidelink channels to receive and perform correlation on each sidelink channel to receive or detect the backscatter signals transmitted by the backscatter nodes BN1, BN2, BN3; Or, for FIG. 11, the initiator UE (UE0 in this example) scans the available channels (e.g., channels to find the vacant (or unused or unoccupied) time-frequency resources based on the relative received power in each channel. These resources include the time and frequency resources that the initiator UE uses to send the PRS and the frequency resources that the backscatter nodes may use to frequency shift and reflect (or transmit) the incoming PRS (at different frequency offsets assigned to each backscatter node). The initiator UE (UE0) chooses the time-frequency resources, e.g., those channels or resources less than a specific value, such as <−60 dBm, for the frequency offsets, and assigns those channels or frequency offsets to the backscatter nodes. See also FIG. 11).
- controlling transmitting, by the first user device to the at least some of the backscatter nodes via sidelink communication, configuration information comprising the backscatter frequency offsets assigned to the backscatter nodes to be positioned (e.g., operation 4 of FIG. 7: The initiator UE (UE0 in this example) may use the sidelink to send a message to . . . provide configuration information that indicates the assigned frequency shifts or vacant sidelink channels assigned to each of the one or more backscatter nodes or tags. The backscatter nodes or tags may then configure themselves to perform frequency shift to their assigned backscatter frequency offset, to frequency shift and reflect a received signal, see also FIG. 11).
- in response to receiving, by the first user device from one or more of the backscatter nodes, at least one acknowledgement to the configuration information, controlling transmitting, by the first user device, the positioning signal using time-frequency resources found unused by the first user device or allocated by a network node (e.g., see one or more of operations 5-7B of FIG. 7: e.g., Acknowledgements from backscatter nodes: The initiator UE (UE0) may transmit or emit a signal, such that the backscatter tags may modulate, shift to the assigned frequencies, and reflect the signal back with acknowledgement that the configuration was successful. The UEs (e.g., UE0 to UE3) may receive the reflected responses (acknowledgements) from the backscatter tags/backscatter nodes; 7b) (FIG. 7) Activate UE PRS transmission: The gNB 712 may activate the UE's PRS transmission. The initiator UE (UE0) performs the positioning (e.g., PRS) signal transmission according to the time domain behavior of PRS resource configuration using the sidelink (e.g., initiator UE transmits PRS signal via time-frequency resources of sidelink channel, that have been allocated by gNB 712 for PRS transmission; see also FIG. 11).
- controlling receiving, by the first user device via sidelink communication, channel estimate information from a plurality of second user devices, wherein a channel estimate information indicates an estimate of a channel between one of the plurality of second user devices and each of the at least some of the backscatter nodes, and wherein the channel estimate information received from each second user device is based on the transmitted positioning signal that is frequency shifted by an assigned backscatter frequency offset and reflected by each of the at least some of the backscatter nodes (e.g., FIG. 7, 11: See, for example, operation 9 of FIG. 7: The UEs measure the channel estimates (determine channel estimation information) based on the received backscatter (frequency shifted and reflected) signals received from the backscatter nodes. The UEs (e.g., non-initiator UEs, such as UE1, UE2, UE3) may send their channel estimate information to the initiator UE (UE0)).
- controlling transmitting, by the first user device to the network node, the received channel estimate information (see, e.g., FIGS. 7, and/or 11: The initiator UE (UE0) may then send to the gNB 712 and/or LMF 710, the received channel estimate information (e.g., received from other UEs), for one or more UEs, and one or more backscatter nodes).

Example 2. The method of example 1, further comprising: controlling receiving, by the first user device from the network node, a positioning request for the backscatter nodes to be positioned (e.g., see operation 3 of FIG. 7: gNB PRS configuration: The serving gNB may send a positioning request to the initiator UE).

Example 3. The method of any of examples 1-2, wherein the backscatter frequency offset assigned to each of the backscatter nodes identifies a vacant or unoccupied sidelink channel to be used by a backscatter node to transmit a backscatter signal, wherein the backscatter signal transmitted by a backscatter node comprises the positioning signal that is frequency shifted by an assigned backscatter node-specific frequency offset and reflected by the backscatter node (e.g., see operation 4 of FIG. 7 and operation 3 of FIG. 11: The initiator UE (UE0 in this example) may use the sidelink to send a message to provide configuration information that indicates the assigned frequency shifts or vacant sidelink channels assigned to each of the one or more backscatter nodes or tags (the backscatter node-specific frequency offsets assigned to each backscatter node). The backscatter frequency offset assigned to each of the backscatter nodes identifies a vacant or unoccupied sidelink channel to be used by a backscatter node to transmit a backscatter signal, wherein the backscatter signal transmitted by a backscatter node comprises the positioning signal that is frequency shifted by an assigned backscatter node-specific frequency offset and reflected by the backscatter node).

Example 4. The method of any of examples 1-3, wherein the channel estimate information comprises information of a channel frequency response that includes at least one of phase information or timing information based on the positioning signal that is frequency shifted by an assigned backscatter frequency offset and reflected by each of the at least some of the backscatter nodes.

Example 5. The method of any of examples 1-4, wherein the determining backscatter frequency offsets assigned to backscatter nodes to be positioned comprises the first user device performing at least one of:

receiving, by the first user device from the network node, a list of the backscatter nodes to be positioned and a backscatter frequency offset assigned to each of the backscatter nodes to be positioned (e.g., see operation 3 of FIG. 7: gNB PRS configuration: The serving gNB 712 configures the initiator UE (UE0) with the UL-PRS resources and configures the selected UEs to monitor the channels during aperiodic wake-up. Thus, at 3), gNB 712 may send a message to UE0, UE1, UE2, and UE3 to indicate the time-frequency resources over which UE0 may transmit a PRS signal. Also, gNB 712 may also indicate to the UEs the backscatter frequency offsets (or vacant sidelink channels) that are assigned to each of the backscatter nodes or tags); or performing the following by the first user device: determining the backscatter nodes to be positioned; identifying a set of backscatter frequency offsets that are associated with vacant or unused time-frequency resources for sidelink communication; and assigning a backscatter frequency offset, of the set of backscatter frequency offsets, to each of the backscatter nodes to be positioned (e.g., see operation 1 of FIG. 11: The initiator UE (UE0 in this example) scans the available channels (e.g., channels to find the vacant (or unused or unoccupied) time-frequency resources based on the relative received power in each channel. These resources include the time and frequency resources that the initiator UE uses to send the PRS and the frequency resources that the backscatter nodes may use to frequency shift and reflect (or transmit) the incoming PRS (at different frequency offsets assigned to each backscatter node. The initiator UE assigns the frequency offsets to the backscatter nodes).

Example 6. The method of any of examples 1-5, wherein the controlling transmitting configuration information comprises: controlling transmitting, by the first user device to at least some of the backscatter nodes to be positioned via sidelink communication, a wakeup signal to cause the at least some of the backscatter nodes to be positioned to wake up from a low power state, a synchronization signal, and the configuration information including at least the backscatter frequency offsets assigned to the backscatter nodes (e.g., operation 4 of FIG. 7, and/or operation 3 of FIG. 11: 4) Initiator UE transmission of wakeup, synchronization and configuration information to backscatter nodes.: The initiator UE (UE0 in this example) may use the sidelink to send a message to wake up the backscatter nodes, provide synchronization signal (to allow the backscatter nodes to perform synchronization to the initiator UE) and provide configuration information that indicates the assigned frequency shifts or vacant sidelink channels assigned to each of the one or more backscatter nodes or tags (the backscatter node-specific frequency offsets assigned to each backscatter node).

Example 7. The method of example 6, wherein the controlling transmitting the positioning signal comprises: receiving, by the first user device from at least one of the backscatter nodes to be positioned, an acknowledgement that the configuration information was received; and controlling transmitting, by the first user device, a positioning reference signal in response to receiving the acknowledgement from the at least one of the backscatter nodes to be positioned.

Example 8. The method of any of examples 1-7, wherein the reference signal comprises a first reference signal, the method further comprising: in response to receiving a request from the network node, switching responsibilities, from the first user device to one of the second user devices, for transmission of a second positioning signal as part of a positioning procedure to position the backscatter nodes to be positioned (e.g., operation 10 of FIG. 7, and/or operation 7 of FIG. 11: Switch or rotate the initiator UE role to another UE. The gNB 712 (or other entity or node(s)) may assign the initiator UE role to another UE, e.g., to the next closest UE (e.g., UE1). Or, the UEs may communicate and determine a (e.g., different) UE to become the initiator for a next time period).

Example 9. The method of example 8, further comprising: controlling receiving, by a first user device, a backscatter signal from at least some of the backscatter nodes, wherein each of the backscatter signals is based on the second positioning signal that has been frequency shifted by an assigned backscatter frequency offset and reflected by each of at least some of the backscatter nodes to be positioned;

determining, by the first user device based on a backscatter signal received from at least some of the backscatter nodes to be positioned, channel estimate information that indicates an estimate of a channel between the first user device and each of the at least some of the backscatter nodes to be positioned, and wherein the channel estimate information is based on the transmitted second positioning signal that is frequency shifted by an assigned backscatter frequency offset and reflected by each of the at least some of the backscatter nodes to be positioned (e.g., operation 8 of FIG. 7, operation 5 of FIG. 11: After the UE0 becomes a non-initiator UE, UE0 may determine, based on a backscatter signal received from at least some of the backscatter nodes to be positioned, channel estimate information that indicates an estimate of a channel between the first user device and each of the at least some of the backscatter nodes to be positioned, and wherein the channel estimate information is based on the transmitted second positioning signal that is frequency shifted by an assigned backscatter frequency offset and reflected by each of the at least some of the backscatter nodes to be positioned); and controlling transmitting, by the first user device to the one of the second user devices via sidelink communication, the channel estimate information determined by the first user device (e.g., operation 9 of FIG. 7, and/or operation 6 of FIG. 11: The non-initiator UEs may send their channel estimate information to the initiator UE).

Example 10. A non-transitory computer-readable storage medium comprising instructions stored thereon that, when executed by at least one processor, are configured to cause a computing system to perform the method of any of examples 1-9.

Example 11. An apparatus comprising means for performing the method of any of examples 1-9.

Example 12. An apparatus comprising: at least one processor (1504, FIG. 15); and at least one memory (1506, FIG. 15) including computer program code; the at least one memory and the computer program code configured to, with the at least one processor, cause the apparatus at least to perform the method of any of examples 1-9.

Example 13. An apparatus comprising: at least one processor (1504, FIG. 15); and at least one memory (1506, FIG. 15) including computer program code; the at least one memory and the computer program code configured to, with the at least one processor, cause the apparatus at least to: determine, by a first user device within a wireless network, backscatter frequency offsets assigned to backscatter nodes to be positioned, wherein a specific backscatter frequency offset is assigned to each backscatter node, and wherein each of the backscatter nodes is identifiable based on an assigned backscatter frequency offset used when at least some of the backscatter nodes reflect a positioning signal; control transmitting, by the first user device to the at least some of the backscatter nodes via sidelink communication, configuration information comprising the backscatter frequency offsets assigned to the backscatter nodes to be positioned; in response to receiving, by the first user device from one or more of the backscatter nodes, at least one acknowledgement to the configuration information, control transmitting, by the first user device, the positioning signal using time-frequency resources found unused by the first user device or allocated by a network node; control receiving, by the first user device via sidelink communication, channel estimate information from a plurality of second user devices, wherein a channel estimate information indicates an estimate of a channel between one of the plurality of second user devices and each of the at least some of the backscatter nodes, and wherein the channel estimate information received from each second user device is based on the transmitted positioning signal that is frequency shifted by an assigned backscatter frequency offset and reflected by each of the at least some of the backscatter nodes; and control transmitting, by the first user device to the network node, the received channel estimate information.

Example 14. A method comprising: controlling receiving, by a first user device within a wireless network from either a network node or a second user device, backscatter frequency offsets assigned to backscatter nodes to be positioned, wherein a specific backscatter frequency offset is assigned to each backscatter node, and wherein each of the backscatter nodes is identifiable based on an assigned backscatter frequency offset used when at least some of the backscatter nodes reflect a positioning signal (operation 3 of FIG. 7 and/or operation 2 of FIG. 11: gNB 712, or initiator UE0, may send a message to non-initiator UEs (UE1, UE2, and UE3) to indicate the backscatter frequency offsets (or vacant sidelink channels) that are assigned to each of the backscatter nodes or tags);

controlling receiving, by the first user device, a backscatter signal from at least some of the backscatter nodes to be positioned, wherein each of the backscatter signals is based on the positioning signal that has been frequency shifted by an assigned backscatter frequency offset and reflected by each of at least some of the backscatter nodes to be positioned (e.g., operations 7a, 7b and 8 of FIG. 7, and/or operation 5 of FIG. 11: The backscatter nodes shift the frequency of the incoming (received) PRS (from the initiator UE) to their assigned backscatter frequency offsets or assigned channels, and reflect the frequency shifted signal (these are backscatter signals). Non-initiator or neighbor UEs receive backscatter (frequency shifted and reflected) signals from one or more backscatter nodes);

determining, by the first user device based on a backscatter signal received from each of at least some of the backscatter nodes to be positioned, channel estimate information that indicates an estimate of a channel between the first user device and each of the at least some of the backscatter nodes to be positioned, wherein the channel estimate information is based on the positioning signal that is frequency shifted by an assigned backscatter frequency offset and reflected by each of the at least some of the backscatter nodes to be positioned (e.g., operation 8 of FIG. 7: The UEs that receive the PRSs estimate the respective channels (backscatter node-UE channel) from all the antennas. Estimating the UE-backscatter channel may include determining channel estimate information, which may include one or more signal measurements or parameters that may describe the channel frequency response of the channel between the backscatter node and the measuring UE. For example, channel estimate information may include phase information and/or time or timing (e.g., a time of a correlation peak for each backscatter frequency offset or channel); and controlling transmitting, by the first user device to the second user device via sidelink communication, the channel estimate information determined by the first user device (e.g., operation 9 of FIG. 7: The UEs measure the channel estimates (determine channel estimation information) based on the received backscatter (frequency shifted and reflected) signals received from the backscatter nodes. The UEs (e.g., non-initiator UEs, such as UE1, UE2, UE3) may send their channel estimate information to the initiator UE (UE0).

Example 15. The method of example 14, further comprising: receiving, by the first user device from the second user device, the positioning signal, wherein the positioning signal comprises a reference signal used for positioning the backscatter nodes to be positioned (e.g., the positioning signal may include a reference signal, such as a positioning references signal that may be used for positioning).

Example 16. The method of any of examples 14-15, wherein the channel estimate information comprises information of a channel frequency response that includes at least one of phase information or timing information based on the positioning signal that is frequency shifted by an assigned backscatter frequency offset and reflected by each of the at least some of the backscatter nodes (e.g., operation 8 of FIG. 7: Estimating the UE-backscatter channel may include determining channel estimate information, which may include one or more signal measurements or parameters that may describe the channel frequency response of the channel between the backscatter node and the measuring UE. For example, channel estimate information may include phase information and/or time or timing (e.g., a time of a correlation peak for each backscatter frequency offset or channel).

Example 17. The method of any of examples 14-16, wherein the backscatter frequency offset assigned to each of the backscatter nodes identifies a vacant or unoccupied sidelink channel to be used by a backscatter node to transmit a backscatter signal, wherein the backscatter signal transmitted by a backscatter node comprises the positioning signal that is frequency shifted by an assigned backscatter node-specific frequency offset and reflected by the backscatter node (e.g., see operation 2 of FIG. 7: Time-frequency resources may be determined that the initiator UE (UE0) uses to transmit the PRS, and the frequency resources (e.g., vacant or unoccupied sidelink channels corresponding to backscatter frequency offsets) the backscatter nodes may use to frequency shift and reflect the incoming PRS).

Example 18. A non-transitory computer-readable storage medium comprising instructions stored thereon that, when executed by at least one processor, are configured to cause a computing system to perform the method of any of examples 14-17.

Example 19. An apparatus comprising means for performing the method of any of examples 14-17.

Example 20. An apparatus comprising: at least one processor; and at least one memory including computer program code; the at least one memory and the computer program code configured to, with the at least one processor, cause the apparatus at least to perform the method of any of examples 14-17.

Example 21. An apparatus comprising: at least one processor; and at least one memory including computer program code; the at least one memory and the computer program code configured to, with the at least one processor, cause the apparatus at least to: control receiving, by a first user device within a wireless network from either a network node or a second user device, backscatter frequency offsets assigned to backscatter nodes to be positioned, wherein a specific backscatter frequency offset is assigned to each backscatter node, and wherein each of the backscatter nodes is identifiable based on an assigned backscatter frequency offset used when at least some of the backscatter nodes reflect a positioning signal; control receiving, by the first user device, a backscatter signal from at least some of the backscatter nodes to be positioned, wherein each of the backscatter signals is based on the positioning signal that has been frequency shifted by an assigned backscatter frequency offset and reflected by each of at least some of the backscatter nodes to be positioned; determine, by the first user device based on a backscatter signal received from each of at least some of the backscatter nodes to be positioned, channel estimate information that indicates an estimate of a channel between the first user device and each of the at least some of the backscatter nodes to be positioned, wherein the channel estimate information is based on the positioning signal that is frequency shifted by an assigned backscatter frequency offset and reflected by each of the at least some of the backscatter nodes to be positioned; and control transmitting, by the first user device to the second user device via sidelink communication, the channel estimate information determined by the first user device.

Example 22. A method comprising:

determining, by a network node within a wireless network, time-frequency resources for transmission of a positioning signal by a first user device via sidelink communications, and backscatter frequency offsets assigned to backscatter nodes to be positioned, wherein a specific backscatter frequency offset is assigned to each backscatter node to be positioned, and wherein each of the backscatter nodes to be positioned is identifiable based on an assigned backscatter frequency offset used when at least some of the backscatter nodes reflect the positioning signal (e.g., operation 2, FIG. 7:) gNB selection and determine uplink/sidelink positioning signal (e.g., PRS) resources: The serving gNB 712 may determine the time-frequency resources for positioning signal (e.g., uplink-PRS) transmission (e.g., sidelink resources) for locating the backscatter nodes or tags (BN1, BN2, BN3, . . . ). These resources may include the time and frequency resources that the initiator UE (UE0) uses to transmit the PRS, and the frequency resources (e.g., vacant or unoccupied sidelink channels corresponding to backscatter frequency offsets) the backscatter nodes may use to frequency shift and reflect the incoming PRS);

controlling transmitting, by the network node to the first user device, the time-frequency resources for transmission of the positioning signal by the first user device via sidelink communication, and information identifying the backscatter frequency offsets assigned to the backscatter nodes to be positioned (e.g., operation 3 of FIG. 7: The serving gNB 712 configures the initiator UE (UE0) with the UL-PRS resources and configures the selected UEs to monitor the channels during aperiodic wake-up. Thus, at 3), gNB 712 may send a message to UE0, UE1, UE2, and UE3 to indicate the time-frequency resources over which UE0 may transmit a PRS signal. Also, gNB 712 may also indicate to the UEs the backscatter frequency offsets (or vacant sidelink channels) that are assigned to each of the backscatter nodes or tags);

controlling transmitting, by the network node to a plurality of second user devices, the information identifying the backscatter frequency offsets assigned to the backscatter nodes to be positioned, for the second user devices to receive a backscatter signal from at least some of the backscatter nodes to be positioned, wherein each of the backscatter signals is based on the positioning signal that has been frequency shifted by an assigned backscatter frequency offset and reflected by each of at least some of the backscatter nodes to be positioned (e.g., operation 3 of FIG. 7: The serving gNB 712 configures the initiator UE (UE0) with the UL-PRS resources and configures the selected UEs to monitor the channels during aperiodic wake-up. Thus, at 3), gNB 712 may send a message to UE0, UE1, UE2, and UE3 to indicate the time-frequency resources over which UE0 may transmit a PRS signal. Also, gNB 712 may also indicate to the UEs the backscatter frequency offsets (or vacant sidelink channels) that are assigned to each of the backscatter nodes or tags); and controlling receiving by the network node from the first user device, channel estimate information determined by each of the plurality of second user devices, wherein the channel estimate information indicates an estimate of a channel between one of the plurality of second user devices and each of the at least some of the backscatter nodes to be positioned, wherein the channel estimate information is based on the positioning signal that is frequency shifted by an assigned backscatter frequency offset and reflected by each of the at least some of the backscatter nodes to be positioned (e.g., operation 9 of FIG. 7: The initiator UE (UE0) may then send to the gNB 712, the received channel estimate information (e.g., received from other UEs), for one or more UEs, and one or more backscatter nodes).

Example 23. The method of example 22, further comprising performing at least one of the following: determining, by the network node based on the received channel estimate information, a position of at least some of the backscatter nodes; or forwarding the channel estimate information to a positioning control entity, for the positioning control entity to determine positions of at least some of the backscatter nodes (e.g., operation 11 of FIG. 7: Upon receiving all the channel estimates (channel estimate information) from all the iterations (e.g., from multiple UEs and/or for different backscatter node-UE links, as forwarded by different initiator UEs), the gNB 712 and/or LMF 710 may compute or determine the positions of the backscatter nodes and may send a message to the client, application or node that requested the positions or locations of the backscatter nodes or tags. Alternatively, the gNB 712 may simply forward the measured channel estimates to a positioning control entity, such as the LMF. Thus, the gNB 712 may: determine, based on the received channel estimate information, a position of at least some of the backscatter nodes; or, forward the channel estimate information to a positioning control entity (e.g., LMF 710), for the positioning control entity to determine positions of at least some of the backscatter nodes).

Example 24. The method of any of examples 22-23, wherein the channel estimate information comprises information of a channel frequency response that includes at least one of phase information or timing information based on the positioning signal that is frequency shifted by an assigned backscatter frequency offset and reflected by each of the at least some of the backscatter nodes.

Example 25. The method of any of examples 22-24, wherein the backscatter frequency offset assigned to each of the backscatter nodes identifies a vacant or unoccupied sidelink channel to be used by a backscatter node to transmit a backscatter signal, wherein the backscatter signal transmitted by a backscatter node comprises the positioning signal that is frequency shifted by an assigned backscatter node-specific frequency offset and reflected by the backscatter node.

Example 26. A non-transitory computer-readable storage medium comprising instructions stored thereon that, when executed by at least one processor, are configured to cause a computing system to perform the method of any of examples 22-25.

Example 27. An apparatus comprising means for performing the method of any of examples 22-25.

Example 28. An apparatus comprising: at least one processor; and at least one memory including computer program code; the at least one memory and the computer program code configured to, with the at least one processor, cause the apparatus at least to perform the method of any of examples 20-23.

Example 29. An apparatus comprising: at least one processor; and at least one memory including computer program code; the at least one memory and the computer program code configured to, with the at least one processor, cause the apparatus at least to: determine, by a network node within a wireless network, time-frequency resources for transmission of a positioning signal by a first user device via sidelink communications, and backscatter frequency offsets assigned to backscatter nodes to be positioned, wherein a specific backscatter frequency offset is assigned to each backscatter node to be positioned, and wherein each of the backscatter nodes to be positioned is identifiable based on an assigned backscatter frequency offset used when at least some of the backscatter nodes reflect the positioning signal; control transmitting, by the network node to the first user device, the time-frequency resources for transmission of the positioning signal by the first user device via sidelink communication, and information identifying the backscatter frequency offsets assigned to the backscatter nodes to be positioned; control transmitting, by the network node to a plurality of second user devices, the information identifying the backscatter frequency offsets assigned to the backscatter nodes to be positioned, for the second user devices to receive a backscatter signal from at least some of the backscatter nodes to be positioned, wherein each of the backscatter signals is based on the positioning signal that has been frequency shifted by an assigned backscatter frequency offset and reflected by each of at least some of the backscatter nodes to be positioned; and control receiving by the network node from the first user device, channel estimate information determined by each of the plurality of second user devices, wherein the channel estimate information indicates an estimate of a channel between one of the plurality of second user devices and each of the at least some of the backscatter nodes to be positioned, wherein the channel estimate information is based on the positioning signal that is frequency shifted by an assigned backscatter frequency offset and reflected by each of the at least some of the backscatter nodes to be positioned.

Figure 15:
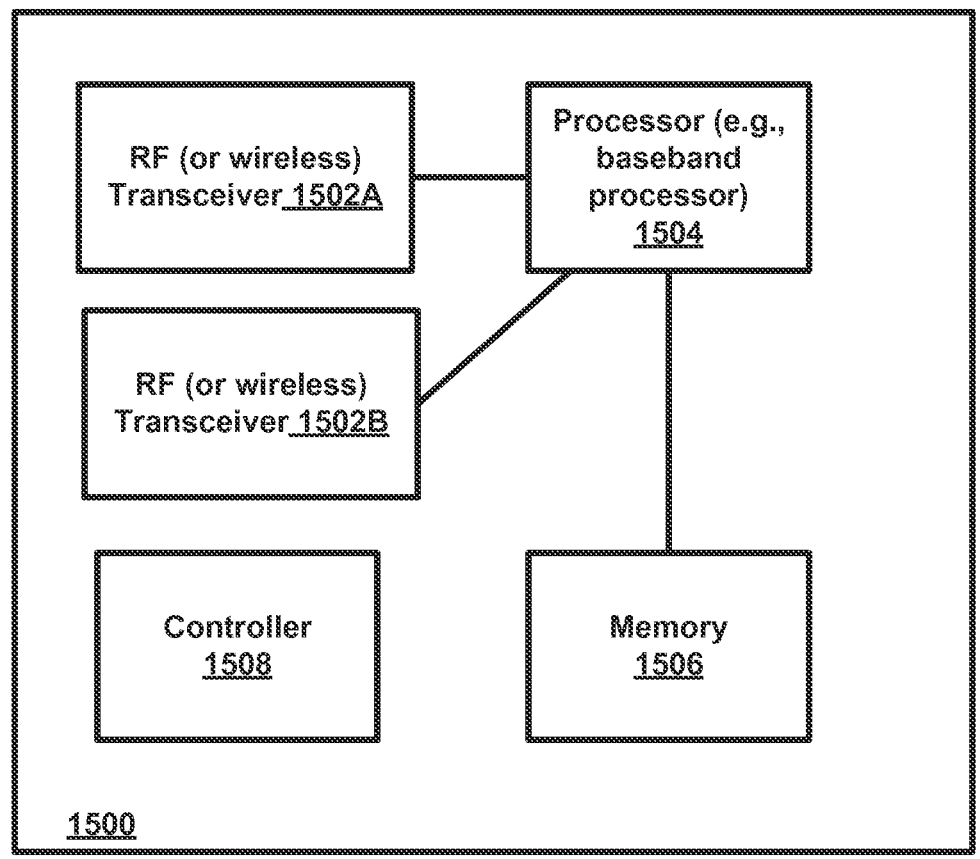
FIG. 15 is a block diagram of a wireless station or node (e.g., AP, BS, RAN node, DU UE or user device, or network node).

FIG. 15 is a block diagram of a wireless station (e.g., AP, BS or user device/UE, or other network node) 1500 according to an example embodiment. The wireless station 1500 may include, for example, one or more (e.g., two as shown in FIG. 15) RF (radio frequency) or wireless transceivers 1502A, 1502B, where each wireless transceiver includes a transmitter to transmit signals and a receiver to receive signals. The wireless station also includes a processor or control unit/entity (controller) 1504 to execute instructions or software and control transmission and receptions of signals, and a memory 1506 to store data and/or instructions.

Processor 1504 may also make decisions or determinations, generate frames, packets or messages for transmission, decode received frames or messages for further processing, and other tasks or functions described herein. Processor 1504, which may be a baseband processor, for example, may generate messages, packets, frames or other signals for transmission via wireless transceiver 1502 (1502A or 1502B). Processor 1504 may control transmission of signals or messages over a wireless network, and may control the reception of signals or messages, etc., via a wireless network (e.g., after being down-converted by wireless transceiver 1502, for example). Processor 1504 may be programmable and capable of executing software or other instructions stored in memory or on other computer media to perform the various tasks and functions described above, such as one or more of the tasks or methods described above. Processor 1504 may be (or may include), for example, hardware, programmable logic, a programmable processor that executes software or firmware, and/or any combination of these. Using other terminology, processor 1504 and transceiver 1502 together may be considered as a wireless transmitter/receiver system, for example.

In addition, referring to FIG. 15, a controller (or processor) 1508 may execute software and instructions, and may provide overall control for the station 1500, and may provide control for other systems not shown in FIG. 15, such as controlling input/output devices (e.g., display, keypad), and/ or may execute software for one or more applications that may be provided on wireless station 1500, such as, for example, an email program, audio/video applications, a word processor, a Voice over IP application, or other application or software.

In addition, a storage medium may be provided that includes stored instructions, which when executed by a controller or processor may result in the processor 1504, or other controller or processor, performing one or more of the functions or tasks described above.

According to another example embodiment, RF or wireless transceiver(s) 1502A/1502B may receive signals or data and/or transmit or send signals or data. Processor 1504 (and possibly transceivers 1502A/1502B) may control the RF or wireless transceiver 1502A or 1502B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD- ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
   determining, by a first user device within a wireless network, backscatter frequency offsets assigned to backscatter nodes to be positioned, wherein a specific backscatter frequency offset is assigned to each backscatter node, and wherein each of the backscatter nodes is identifiable based on an assigned backscatter frequency offset used when at least some of the backscatter nodes reflect a positioning signal;
   controlling transmitting, by the first user device to the at least some of the backscatter nodes via sidelink communication, configuration information comprising the backscatter frequency offsets assigned to the backscatter nodes to be positioned;
   in response to receiving, by the first user device from one or more of the backscatter nodes, at least one acknowledgement to the configuration information, controlling transmitting, by the first user device, the positioning signal using time-frequency resources found unused by the first user device or allocated by a network node;
   controlling receiving, by the first user device via sidelink communication, channel estimate information from a plurality of second user devices, wherein a channel estimate information indicates an estimate of a channel between one of the plurality of second user devices and each of the at least some of the backscatter nodes, and wherein the channel estimate information received from each second user device is based on the transmitted positioning signal that is frequency shifted by an assigned backscatter frequency offset and reflected by each of the at least some of the backscatter nodes; and
   controlling transmitting, by the first user device to the network node, the received channel estimate information.

2. The method of claim 1, further comprising:
   controlling receiving, by the first user device from the network node, a positioning request for the backscatter nodes to be positioned.

3. The method of claim 1, wherein the backscatter frequency offset assigned to each of the backscatter nodes identifies a vacant or unoccupied sidelink channel to be used by a backscatter node to transmit a backscatter signal, wherein the backscatter signal transmitted by a backscatter node comprises the positioning signal that is frequency shifted by an assigned backscatter node-specific frequency offset and reflected by the backscatter node.

4. The method of claim 1, wherein the channel estimate information comprises information of a channel frequency response that includes at least one of phase information or timing information based on the positioning signal that is frequency shifted by an assigned backscatter frequency offset and reflected by each of the at least some of the backscatter nodes.

5. The method of claim 1, wherein the determining backscatter frequency offsets assigned to backscatter nodes to be positioned comprises the first user device performing at least one of:
   receiving, by the first user device from the network node, a list of the backscatter nodes to be positioned and a backscatter frequency offset assigned to each of the backscatter nodes to be positioned; or
   performing the following by the first user device:
      determining the backscatter nodes to be positioned;
      identifying a set of backscatter frequency offsets that are associated with vacant or unused time-frequency resources for sidelink communication; and
      assigning a backscatter frequency offset, of the set of backscatter frequency offsets, to each of the backscatter nodes to be positioned.

6. The method of claim 1, wherein the controlling transmitting configuration information comprises:
   controlling transmitting, by the first user device to at least some of the backscatter nodes to be positioned via sidelink communication, a wakeup signal to cause the at least some of the backscatter nodes to be positioned to wake up from a low power state, a synchronization signal, and the configuration information including at least the backscatter frequency offsets assigned to the backscatter nodes.

7. The method of claim 1, wherein the positioning signal comprises a first positioning signal, the method further comprising:
   in response to receiving a request from the network node, switching responsibilities, from the first user device to one of the second user devices, for transmission of a second positioning signal as part of a positioning procedure to position the backscatter nodes to be positioned.

8. An apparatus comprising:
   at least one processor; and
   at least one memory including computer program code;
   the at least one memory and the computer program code configured to, with the at least one processor, cause the apparatus at least to:
      determine, by a first user device within a wireless network, backscatter frequency offsets assigned to backscatter nodes to be positioned, wherein a specific backscatter frequency offset is assigned to each backscatter node, and wherein each of the backscatter nodes is identifiable based on an assigned backscatter frequency offset used when at least some of the backscatter nodes reflect a positioning signal;

control transmitting, by the first user device to the at least some of the backscatter nodes via sidelink communication, configuration information comprising the backscatter frequency offsets assigned to the backscatter nodes to be positioned;

in response to receiving, by the first user device from one or more of the backscatter nodes, at least one acknowledgement to the configuration information, control transmitting, by the first user device, the positioning signal using time-frequency resources found unused by the first user device or allocated by a network node;

control receiving, by the first user device via sidelink communication, channel estimate information from a plurality of second user devices, wherein a channel estimate information indicates an estimate of a channel between one of the plurality of second user devices and each of the at least some of the backscatter nodes, and wherein the channel estimate information received from each second user device is based on the transmitted positioning signal that is frequency shifted by an assigned backscatter frequency offset and reflected by each of the at least some of the backscatter nodes; and control transmitting, by the first user device to the network node, the received channel estimate information.

9. The apparatus of claim 8, further comprising causing the apparatus to:
control receiving, by the first user device from the network node, a positioning request for the backscatter nodes to be positioned.

10. The apparatus of claim 8, wherein the backscatter frequency offset assigned to each of the backscatter nodes identifies a vacant or unoccupied sidelink channel to be used by a backscatter node to transmit a backscatter signal, wherein the backscatter signal transmitted by a backscatter node comprises the positioning signal that is frequency shifted by an assigned backscatter node-specific frequency offset and reflected by the backscatter node.

11. The apparatus of claim 8, wherein the channel estimate information comprises information of a channel frequency response that includes at least one of phase information or timing information based on the positioning signal that is frequency shifted by an assigned backscatter frequency offset and reflected by each of the at least some of the backscatter nodes.

12. The apparatus of claim 8, wherein the determining backscatter frequency offsets assigned to backscatter nodes to be positioned further comprises causing the apparatus to perform at least one of:
receiving, by the first user device from the network node, a list of the backscatter nodes to be positioned and a backscatter frequency offset assigned to each of the backscatter nodes to be positioned; or
determining the backscatter nodes to be positioned;
identifying a set of backscatter frequency offsets that are associated with vacant or unused time-frequency resources for sidelink communication; and
assigning a backscatter frequency offset, of the set of backscatter frequency offsets, to each of the backscatter nodes to be positioned.

13. The apparatus of claim 8, wherein the controlling transmitting configuration information comprises:
controlling transmitting, by the first user device to at least some of the backscatter nodes to be positioned via sidelink communication, a wakeup signal to cause the at least some of the backscatter nodes to be positioned to wake up from a low power state, a synchronization signal, and the configuration information including at least the backscatter frequency offsets assigned to the backscatter nodes.

14. The apparatus of claim 8, wherein the positioning signal comprises a first positioning signal, further comprising causing the apparatus to:
in response to receiving a request from the network node, switching responsibilities, from the first user device to one of the second user devices, for transmission of a second positioning signal as part of a positioning procedure to position the backscatter nodes to be positioned.

15. A method comprising:
controlling receiving, by a first user device within a wireless network from either a network node or a second user device, backscatter frequency offsets assigned to backscatter nodes to be positioned, wherein a specific backscatter frequency offset is assigned to each backscatter node, and wherein each of the backscatter nodes is identifiable based on an assigned backscatter frequency offset used when at least some of the backscatter nodes reflect a positioning signal;

controlling receiving, by the first user device, a backscatter signal from at least some of the backscatter nodes to be positioned, wherein each of the backscatter signals is based on the positioning signal that has been frequency shifted by an assigned backscatter frequency offset and reflected by each of at least some of the backscatter nodes to be positioned;

determining, by the first user device based on a backscatter signal received from each of at least some of the backscatter nodes to be positioned, channel estimate information that indicates an estimate of a channel between the first user device and each of the at least some of the backscatter nodes to be positioned, wherein the channel estimate information is based on the positioning signal that is frequency shifted by an assigned backscatter frequency offset and reflected by each of the at least some of the backscatter nodes to be positioned; and controlling transmitting, by the first user device to the second user device via sidelink communication, the channel estimate information determined by the first user device.

16. The method of claim 15, further comprising:
receiving, by the first user device from the second user device, the positioning signal, wherein the positioning signal comprises a reference signal used for positioning the backscatter nodes to be positioned.

17. The method of claim 15, wherein the channel estimate information comprises information of a channel frequency response that includes at least one of phase information or timing information based on the positioning signal that is frequency shifted by an assigned backscatter frequency offset and reflected by each of the at least some of the backscatter nodes.

18. The method of claim 15, wherein the backscatter frequency offset assigned to each of the backscatter nodes identifies a vacant or unoccupied sidelink channel to be used by a backscatter node to transmit a backscatter signal, wherein the backscatter signal transmitted by a backscatter node comprises the positioning signal that is frequency shifted by an assigned backscatter node-specific frequency offset and reflected by the backscatter node.

19. An apparatus comprising:

at least one processor; and at least one memory including computer program code;

the at least one memory and the computer program code configured to, with the at least one processor, cause the apparatus at least to:

control receiving, by a first user device within a wireless network from either a network node or a second user device, backscatter frequency offsets assigned to backscatter nodes to be positioned, wherein a specific backscatter frequency offset is assigned to each backscatter node, and wherein each of the backscatter nodes is identifiable based on an assigned backscatter frequency offset used when at least some of the backscatter nodes reflect a positioning signal;

control receiving, by the first user device, a backscatter signal from at least some of the backscatter nodes to be positioned, wherein each of the backscatter signals is based on the positioning signal that has been frequency shifted by an assigned backscatter frequency offset and reflected by each of at least some of the backscatter nodes to be positioned;

determine, by the first user device based on a backscatter signal received from each of at least some of the backscatter nodes to be positioned, channel estimate information that indicates an estimate of a channel between the first user device and each of the at least some of the backscatter nodes to be positioned, wherein the channel estimate information is based on the positioning signal that is frequency shifted by an assigned backscatter frequency offset and reflected by each of the at least some of the backscatter nodes to be positioned; and control transmitting, by the first user device to the second user device via sidelink communication, the channel estimate information determined by the first user device.

20. The apparatus of claim 19, further comprising causing the apparatus to:

receive, by the first user device from the second user device, the positioning signal, wherein the positioning signal comprises a reference signal used for positioning the backscatter nodes to be positioned.

21. The apparatus of claim 19, wherein the channel estimate information comprises information of a channel frequency response that includes at least one of phase information or timing information based on the positioning signal that is frequency shifted by an assigned backscatter frequency offset and reflected by each of the at least some of the backscatter nodes.

22. The apparatus of claim 19, wherein the backscatter frequency offset assigned to each of the backscatter nodes identifies a vacant or unoccupied sidelink channel to be used by a backscatter node to transmit a backscatter signal, wherein the backscatter signal transmitted by a backscatter node comprises the positioning signal that is frequency shifted by an assigned backscatter node-specific frequency offset and reflected by the backscatter node.

\* \* \* \* \*